United States Patent [19]

Asanuma

[11] Patent Number: 5,893,692

[45] Date of Patent: Apr. 13, 1999

[54] CONTAINER FIXING DEVICE

[75] Inventor: Kiyoshi Asanuma, Aichi-ken, Japan

[73] Assignee: Wago Co., Ltd, Aichi-ken, Japan

[21] Appl. No.: 08/978,370

[22] Filed: Nov. 25, 1997

[30] Foreign Application Priority Data

Nov. 29, 1996 [JP] Japan .................... 8-319446
Sep. 19, 1997 [JP] Japan .................... 9-255540

[51] Int. Cl.$^6$ .................... B60P 7/08
[52] U.S. Cl. .................... 410/83; 410/82
[58] Field of Search .................... 410/82, 83, 71, 410/76; 24/237; 248/500, 503; 280/DIG. 8

[56] References Cited

U.S. PATENT DOCUMENTS

| | | | |
|---|---|---|---|
| 4,394,101 | 7/1983 | Richer | 410/83 |
| 4,419,034 | 12/1983 | DiMartino | 410/83 |
| 4,776,736 | 10/1988 | Tatina | 410/83 |
| 5,356,249 | 10/1994 | Hove | 410/83 |

Primary Examiner—Stephen T. Gordon

Attorney, Agent, or Firm—Nikaido, Marmelstein, Murray & Oram LLP

[57] ABSTRACT

In a container fixing device of the invention, dimension in height can be reduced and the installation location can be extended and operation is simple. A rotary table (13) is in planar shape so that while a cone (10) is transferred from the container receiving position A to the container fixing position B, the rotary table (13) is always supported by rotary supports (16a, 16b, 16c, 16d) and the cone (10) can be maintained to the top end position, and when the cone (10) is transferred from the container receiving position A to the cone lowering position C, the supporting of the rotary table (13) by the rotary supports (16a, 16b, 16c, 16d) is released and the cone (10) can be lowered. Guide plates (18a, 18b, 18c, 18d) are provided so that when the cone (10) is at the cone lowering position C, a peripheral portion of the rotary table (13) is supported by the upper surface, and when the cone (10) is rotated from the cone lowering position C to the cone enclosing position D, the peripheral portion of the rotary table (13) can be guided to the upper surface of the bottom plate by the side surface.

9 Claims, 21 Drawing Sheets 5,893,692

1

CONTAINER FIXING DEVICE

BACKGROUND OF THE INVENTION

1. Field of the Invention

The present invention relates to a container fixing device arranged on a bed of a vehicle capable of performing both container transportation and freight transportation, where during container transportation, a cone is projected on the bed and a container is fixed thereby the container can be loaded on the bed, and during freight transportation, the cone is enclosed under the bed and a freight can be loaded on the bed.

2. Description of the Prior Art

In the prior art, as such a container fixing device of enclosing type, invention disclosed in JP-Y 55-36276 is known.

According to the prior art as above described, however, since dimension in height is large, the container fixing device can not be installed, for example, to the highest part of a tire of a trailer, upper side of a tool-box or the like, and location allowing installation is limited. Also there is a problem that operation is troublesome

SUMMARY OF THE INVENTION

In view of the above-mentioned problems in the prior art, an object of the present invention is to provide a container fixing device where dimension in height can be reduced and location for installation can be extended and operation is simple.

A container fixing device in a first embodiment of the present invention comprises a rotatable cone comprising a head part with length different in planar orthogonal directions and a stem part having diameter less than length in the minor axis direction of the head part, a collar having planar shape corresponding to that of the cone head part and being fitted to upper side of the cone stem part with a gap, a plurality of pushing members arranged on the collar for pushing an outer circumferential surface of the cone stem part elastically and determining the rotational angle position of the cone, a rotary table arranged to lower side of the cone stem part integrally for supporting the collar, a hollow cylindrical housing having an inner space capable of enclosing the cone and the collar, a container support plate formed projecting to the inside at the top end portion of the hollow cylindrical housing and forming a hole corresponding to planar shape of the collar, a plurality of rotary supports arranged projecting to the inside at upper side of the hollow cylindrical housing and at lower side of the container support plate and capable of supporting a peripheral portion of the rotary table, a plurality of guide plates having an upper surface capable of supporting the peripheral portion of the rotary table and arranged at an inner circumferential surface of the hollow cylindrical housing and at lower side of the rotary supports, a bottom plate arranged projecting to the inside at the bottom end portion of the hollow cylindrical housing and capable of supporting the peripheral portion of the rotary table, and a handle arranged at the bottom end portion of the cone and operated by the external force to rotate the cone, wherein the rotary table is in such planar shape that while the rotational angle position and the position in upward and downward direction of the cone are transferred from the container receiving position to the container fixing position, the rotary table is always supported by the rotary supports and the cone can be maintained to the top end, and when the rotational angle position and the

2 position in upward and downward direction of the cone are transferred from the container receiving position to the cone lowering position, supporting of the rotary table by the rotary supports is released and the cone can be lowered, and the guide plate is formed so that when the rotational angle position and the position in upward and downward direction of the cone are in the cone lowering position, the peripheral portion of the rotary table is supported by the upper surface, and when the rotational angle position and the position in upward and downward direction of the cone are transferred from the cone lowering position to the cone enclosing position, the peripheral portion of the rotary table can be guided to the upper surface of the bottom plate by the side surface.

In the container fixing device in the first embodiment, in order to fix a container, first, a handle is operated and a cone and a collar in the enclosing state are projected on a bed and the rotational angle position and the position in upward and downward direction of the cone are set to the container receiving position. In this state, since the major axis direction in planar shape of the cone and the major axis direction in planar shape of the collar are coincident, the cone and the collar can be inserted in a fixing hole of the container. Next, the container is lowered from the upper side, and the cone and the collar are inserted in the fixing hole of the container. And then the handle is operated for rotation counterclockwise for example. By this handle operation, the major axis direction of the cone and the minor axis direction of the collar become coincident, and the head part of the cone is projected to the upper side of a container support plate and covers partially a peripheral portion of the fixing hole of the container thus the container is fixed to the bed. That is, the rotational angle position of the cone and the position in upward and downward direction of the cone are transferred from the container receiving position to the container fixing position.

In order to remove the container from the bed, in reverse order to the above-mentioned operation, the handle is operated for rotation clockwise, and the rotational angle position and the position in upward and downward direction of the cone are transferred from the container fixing position to the container receiving position.

And then, in order that the cone and the collar are transferred from the above-mentioned projecting state to the enclosing state, first, the handle is operated for rotation clockwise in the state that the rotational angle position and the position in upward and downward direction of the cone are in the container receiving position. By this handle operation, a peripheral portion of a rotary table gets out of rotary supports and is lowered and supported by an upper surface of a guide plate, and the rotational angle position and the position in upward and downward direction of the cone are transferred from the container receiving position to the cone lowering position. And then, the handle is operated for rotation counterclockwise. By this handle operation, the peripheral portion of the rotary table gets out of the upper surface of the guide plate and is lowered along a side surface of the guide plate and comes to an upper surface of a bottom plate. That is, the rotational angle position and the position in upward and downward direction of the cone are transferred from the cone lowering position to the cone enclosing position, and the cone and the collar are enclosed in a hollow cylindrical housing.

Thus according to the container fixing device of the first embodiment, since dimension in height of the hollow cylindrical housing can be set to value substantially equal to the sum total of dimensions in height of the cone and the collar, the dimension in height of the container fixing device can be reduced and the installation location can be extended. Also as above described, by simple operation, the rotational angle position and the position in upward and downward direction of the cone can be transferred between the container receiving position and the container fixing position, between the container receiving position and the cone lowering position, and between the cone lowering position and the cone enclosing position Also a container fixing device in a second embodiment of the present invention comprises a rotatable cone comprising a head part with length different in planar orthogonal directions and a stem part having diameter less than length in the minor axis direction of the head part, a collar having planar shape corresponding to that of the cone head part and fitted to upper side of the cone stem part with a gap, a plurality of pushing members arranged on the collar for pushing an outer circumferential surface of the cone stem part elastically and determining the rotational angle position of the cone, a rotary table arranged to lower side of the cone stem part integrally for supporting the collar, a hollow cylindrical housing having an inner space capable of enclosing the cone and the collar, a container support plate formed projecting to the inside at the top end portion of the hollow cylindrical housing and forming a hole corresponding to planar shape of the collar, a plurality of rotary supports arranged projecting to the inside at upper side of the hollow cylindrical housing and at lower side of the container support plate and capable of supporting a peripheral portion of the rotary table, a plurality of guide plates arranged at an inner circumferential surface of the hollow cylindrical housing and at lower side of the rotary supports, a bottom plate arranged projecting to the inside at the bottom end portion of the hollow cylindrical housing and capable of supporting the peripheral portion of the rotary table, and a handle arranged at the bottom end portion of the cone and operated by the external force to rotate the cone, wherein the cone head part is in planar shape having a notch so that when the rotational angle position and the position in upward and downward direction of the cone are transferred from the container receiving position to the cone enclosing position, the cone head part does not cover the container support plate, the rotary table has such planar shape that while the rotational angle position and the position in upward and downward direction of the cone are transferred from the container receiving position to the container fixing position, the rotary table is always supported by the rotary supports and the cone can be maintained to the top end position, and when the rotational angle position and the position in upward and downward direction of the cone are transferred from the container receiving position to the cone lowering position, supporting of the rotary table is released and the cone can be lowered, and the guide plate is formed so that when the rotational angle position of and the position in upward and downward direction of the cone are transferred from the container receiving position to the cone enclosing position, the peripheral portion of the rotary table can be guided to the upper surface of the bottom plate by the side surface.

In the container fixing device in the second embodiment, in order to fix a container, first, a handle is operated and a cone and a collar in the enclosing state are projected on a bed and the rotational angle position and the position in upward and downward direction of the cone are set to the container receiving position. In this state, since the major axis direction in planar shape of the cone and the major axis direction in planar shape of the collar are coincident, the cone and the collar can be inserted in a fixing hole of the container. Next, the container is lowered from the upper side, and the cone and the collar are inserted in the fixing hole of the container. And then the handle is operated for rotation counterclockwise for example. By this handle operation, the major axis direction of the cone and the minor axis direction of the collar becomes coincident and the head part of the cone is projected to upper side of a container support plate and covers partially a peripheral portion of the container thus the container is fixed to the bed. That is, the rotational angle position and the position in upward and downward direction of the cone are transferred from the container receiving position to the container fixing position.

In order to remove the container from the bed, in reverse order to the above-mentioned operation, the handle is operated for rotation clockwise, and the rotational angle position and the position in upward and downward direction of the cone are transferred from the container fixing position to the container receiving position.

And then, in order that the cone and the collar are transferred from the above-mentioned projecting state to the enclosing state, the handle is operated for rotation clockwise in the state that the rotational angle position and the position in upward and downward direction of the cone are in the container receiving position. By this handle operation, a peripheral portion of a rotary table gets out of rotary supports and is guided by a side surface of a guide plate and it lowered to an upper surface of a bottom plate. That is, the rotational angle position and the position in upward and downward direction of the cone are transferred from the container receiving position to the cone enclosing position, and the cone and the collar are enclosed in a hollow cylindrical housing.

Thus according to the container fixing device of the second embodiment, since dimension in height of the hollow cylindrical housing can be set to value substantially equal to the sum total of dimensions in height of the cone and the collar, the dimension in height of the container fixing device can be reduced and the installation location can be extended. Also as above described, by simpler operation, the rotational angle position and the position in upward and downward direction of the cone can be transferred between the container receiving position and the container fixing position, and between the container receiving position and the cone enclosing position.

Also a container fixing device in a third embodiment of the present invention comprises a cone comprising a head part with length different in planar orthogonal directions and a stem part having diameter less than length in the minor axis direction of the head part, a collar having planar shape corresponding to that of the cone head part and fitted to upper side of the cone stem part with a gap, a rotary plate arranged to the cone stem part integrally at lower side of the collar and having a plurality of projections at an outer edge, a hollow cylindrical housing having an inner space capable of enclosing the cone head part and the collar, a container support plate arranged at the top end portion of the hollow cylindrical housing and having a hole capable of passing the cone head part and the collar, a spring shoe arranged projecting to the inside at the bottom end portion of the hollow cylindrical housing, a compression coil spring arranged between the lower surface of the rotary plate and the spring shoe for applying upward pushing force to the rotary plate, a handle connected to the bottom end portion of the cone stem part and operated from the outside, and a plurality of guide plates arranged in the inner circumferential surface of the hollow cylindrical housing and forming a passage guiding the rotary plate projections in substantial oblique direction and having a locking part capable of locking the rotary plate projections at the bottom end portion, wherein when the rotary plate is pushed to the lower surface of the container support plate by the compression coil spring and the major axis direction of the cone head part and the major axis direction of the collar are coincident, the device is in the container receiving state, in the container receiving state the handle is operated for rotation by about 90° in prescribed direction and the major axis direction of the cone head part and the minor axis direction of the collar are coincident thereby the device is in the container lock state, and in the container receiving state the handle is operated for rotation by about 45° in prescribed direction, and if the handle is operated for lowering against the upward pushing force of the compression coil spring applied to the rotary plate, the rotary plate projections are guided to the passage formed by the guide plate, and on the midway of the guiding, coincidence of the major axis direction of the cone head part and the major axis direction of the collar is realized, and by this coincidence, the cone head part can pass through the hole of the container support plate, and then after the handle is further operated for lowering, if the handle is operated for rotation in prescribed direction, the rotary plate projections are locked to the locking part of the guide plate and the cone head part is positioned at lower side of the container support plate and the device is in the cone enclosing state.

According to the container fixing device in the third embodiment, since a cone can be enclosed in a hollow cylindrical housing during non-use state, dimension in height of the device can be reduced and the installation location can be extended. Also since upward pushing force is applied to a rotary plate by a compression coil spring, when the device is transferred from the cone enclosing state to the container receiving state, the force raising the cone becomes unnecessary and the work becomes easy.

DESCRIPTION OF THE PREFERRED EMBODIMENTS

Figure 1:
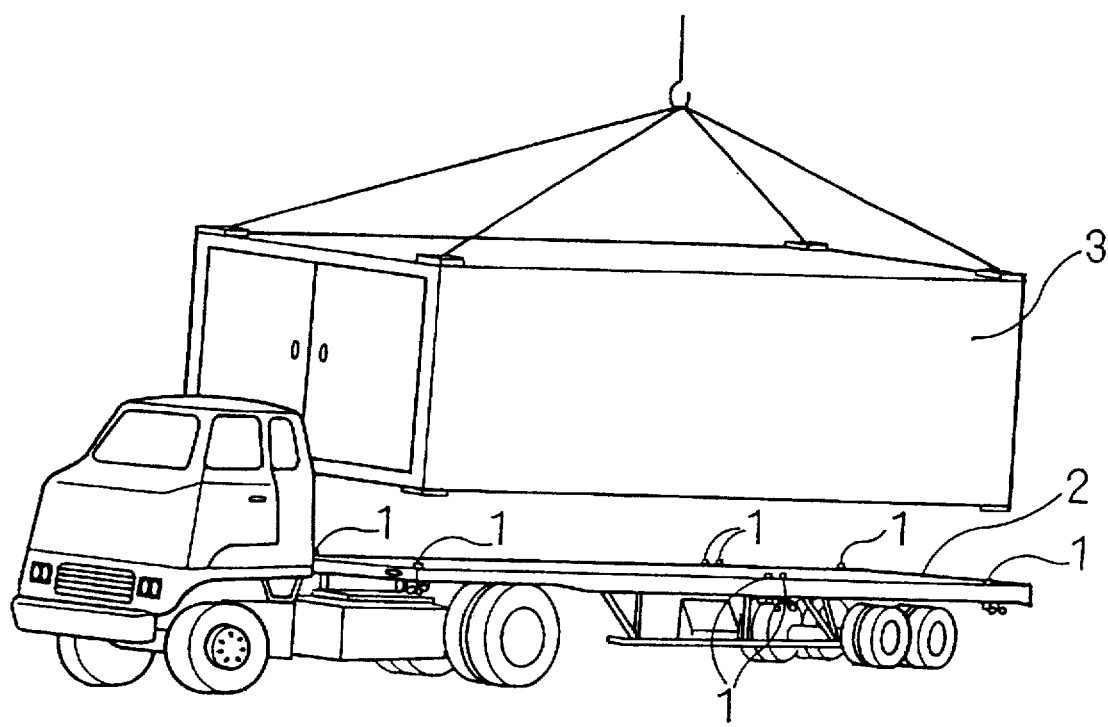
FIG. 1 is a perspective view of a trailer on which a container fixing device according to an embodiment is installed.
Figure 2:
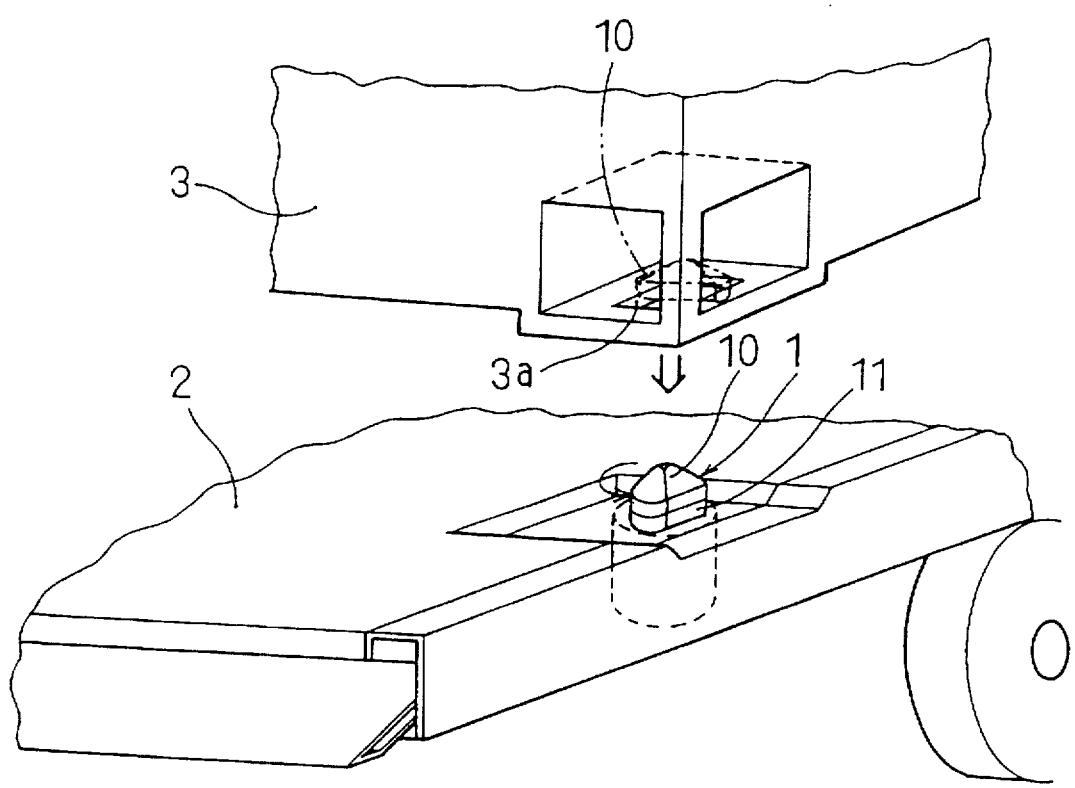
FIG. 2 is a perspective view showing installation state of the container fixing device.

In FIG. 1 and FIG. 2, in an embodiment of the present invention, a plurality of container fixing devices 1 are arranged on a bed 2 of a trailer so that a container 3 is fixed on the bed 2 to allow loading.

Each container fixing device 1 as shown in FIG. 2 has a cone 10 and a collar 11. When the container 3 is fixed to the bed 2, first, the cone 10 and the collar 11 are set in projecting state from the bed 2 as shown in FIG. 2. The container 3 is lowered from the upper side and set to the bed 2 so that the cone 10 is inserted in a fixing hole 3a, and then the cone 10 is rotated by about 90° in arrow direction shown in FIG. 2 and a part of a peripheral portion of the fixing hole 3a is covered by the cone 10 as shown by two dotted line in FIG. 2. Thereby the peripheral portion of the fixing hole 3a is locked by the container fixing device 1 and the container 3 is fixed to the bed 2.

A container fixing device 1 according to an embodiment is specifically constituted as shown in FIGS. 3-10.

In FIGS. 3–10, the container fixing device 1 is provided with a rotatable cone 10 comprising a head part 10a with length different in planar orthogonal directions and a stem part 10b having diameter less than length in the minor axis direction of the head part 10a.

A collar 11 is fitted to upper side of the cone stem part 10b with a gap. The collar 11 has planar shape corresponding to that of the cone head part 10a.

The collar 11 is provided with through holes 11a arranged at regular intervals in the planar circumferential direction, for example, at interval of 180° and extending in the radial directions, and a plurality of pushing members 12 are arranged in each through hole 11a. The pushing member 12 pushes the outer circumferential surface of the cone stem part 10b elastically and defines the rotational angle position of the cone 10, and comprises a steel ball 12a, a compression coil spring 12b and a cover member 12c. The steel ball 12a can be received partially in each of a plurality of recesses 10c formed at regular intervals, for example, at interval of 90° in the planar circumferential direction of the outer circumferentiable cone 10 the cone stem part 10b. The compression coil spring 12b pushes the steel ball 12a against the outer circumferential surface of the cone stem part 10b elastically. The cover member 12c closes the outside opening of the through hole 11a and holds the compression coil spring 12b in the through hole 11a.

A rotary table 13 supporting the collar 11 is arranged to lower side of the cone stem part 10b integrally by screw coupling or the like. The rotary table 13 has a plurality of, e.g., four projections 13a, 13b, 13c, 13d at regular intervals in the planar circumferential direction, for example, at interval of 90°, and pairs of the projections 13a and 13c, 13b and 13d opposed to each other with respect to the center axis are in the same shape. One set of the projections 13a and 13c are formed wide in the planar circumferential direction, and the other set of the projections 13b and 13d are formed narrow in the planar circumferential direction and have notches 13e at the bottom surface.

The cone 10 and the collar 11 can be enclosed in an inner space of a hollow cylindrical housing 14. At the upper end portion of the hollow cylindrical housing 14, a container support plate 15 forming a hole 15a having planar shape slightly larger than that of the collar 11 is formed in projecting to the inside.

At upper side of the hollow cylindrical housing 14 and lower side of the container support plate 15, a plurality of, e.g., four rotary supports 16a, 16b, 16c, 16d capable of supporting the projections 13a, 13b, 13c, 13d of the rotary table 13 are arranged in projecting to the inside. Pairs of the rotary supports 16a and 16b, 16b and 16c, 16c and 16d, 16d and 16a adjacent to each other have pairs of side surfaces 16e and 16f, 16g and 16h, 16i and 16j, 16k and 16l opposed to each other, and distances between 16e and 16f, between 16g and 16h, between 16i and 16j, between 16k and 16l are different alternately along the planar circumferential direction. The longer distance is set larger than the width of the wider projections 13a, 13c of the rotary table 13, and the shorter distance is set smaller than the width of the wider projections 13a, 13c and larger than the width of the narrower projections 13b, 13d.

On the upper surface of the rotary supports 16b, 16d, a plurality of, e.g., two stopper members 17a, 17b are provided at regular intervals, for example, at intervals of 180° in the planar circumferential direction. The stopper members 17a, 17b can abut on the side surfaces 13f, 13g, 13h, 13i of the wider projections 13a, 13c of the rotary table 13, but can not abut on the narrower projections 13b, 13d on account of existence of the notch 13e in the projections 13b, 13d.

On the inner circumferential surface of the hollow cylindrical housing 14, a plurality of, e.g., four guide plates 18a, 18b, 18c, 18d are arranged. The guide plates 18a, 18b, 18c, 18d are positioned at lower side of gaps formed by the side surfaces 16e and 16f, 16g and 16h, 16i and 16j, 16k and 16l opposed to each other between the rotary supports 16a and 16b, 16b and 16c, 16c and 16d, 16d and 16a adjacent to each other respectively. The guide plates 18a, 18b, 18c, 18d have upper surfaces 18e, 18f, 18g, 18h respectively capable of supporting the wider projections 13a, 13c of the rotary table 13. Distance between the side surfaces 18i and 18j, 18k and 18l, 18m and 18n, 18o and 18p opposed to each other of the guide plates 18a and 18b, 18b and 18c, 18c and 18d, 18d and 18a adjacent to each other are different alternately along the planar circumferential direction. The major axis distance is set larger than the width of the wider projections 13a, 13c of the rotary table 13, and the minor axis distance is set smaller than the width of the wider projections 13a, 13c and larger than the width of the narrower projections 13b, 13d.

At the bottom end portion of the hollow cylindrical housing 14, a bottom plate 19 capable of supporting the wider projections 13a, 13c and the narrower projections 13b, 13d of the rotary table 13 is arranged projecting to the inside.

At the bottom end portion of the cone 10, a handle 20 operated by the external force to rotate the cone 10 is arranged. The handle 20 is constituted by a round bar, a spring pin or the like, and is inserted in a through hole 10d in the horizontal direction formed at the cone stem part 10b so as to pass through the center thereof and a through hole 13j of the rotary table 13 formed extending on the extension of the through hole 10d and is fixed.

Next, operation and action of the container fixing device 1 in the above-mentioned constitution will be described.

Figure 3:
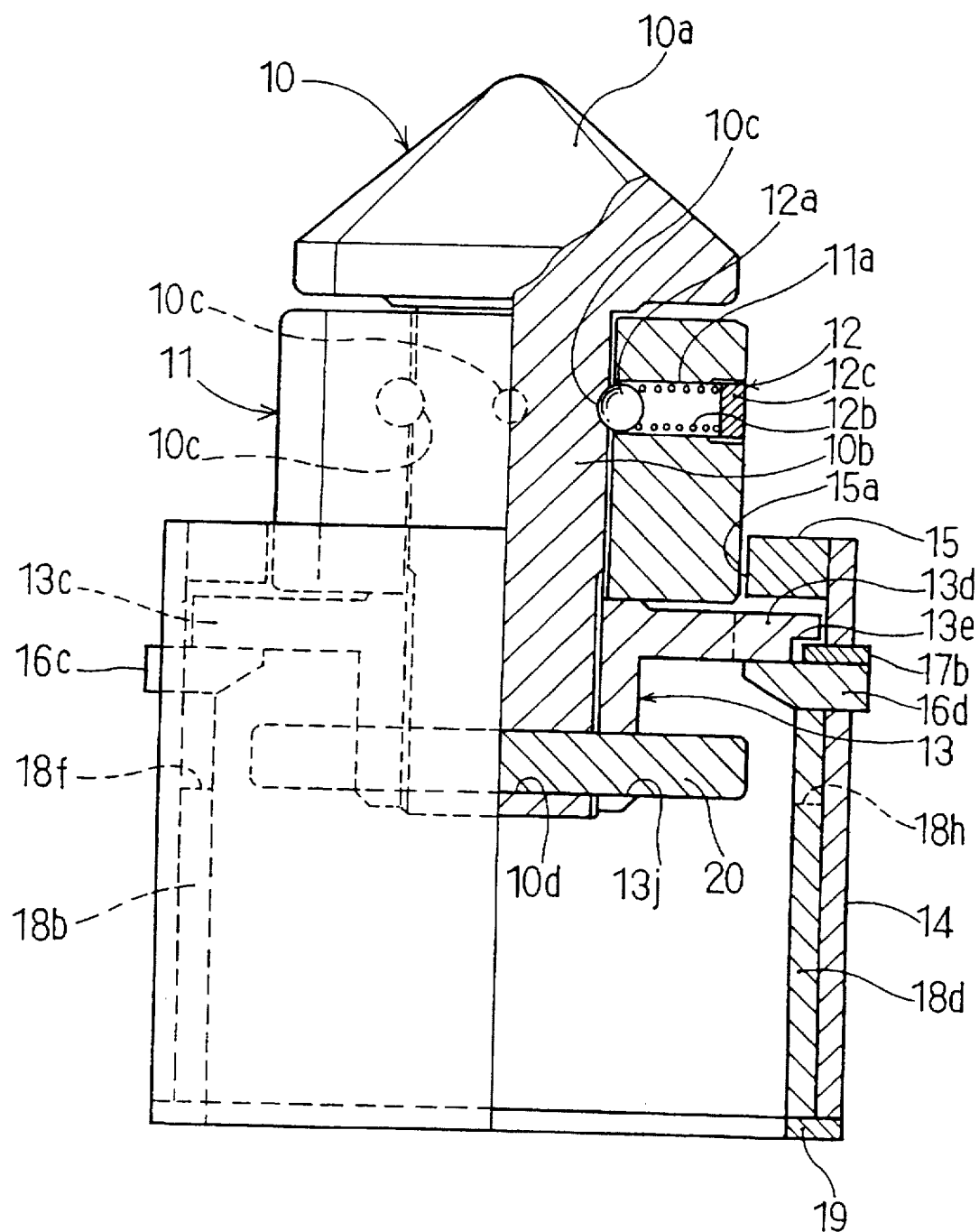
FIG. 3 is a semisectional side view of the container fixing device which the rotational angle position and the position in upward and downward direction of a cone is at the container receiving state.
Figure 4:
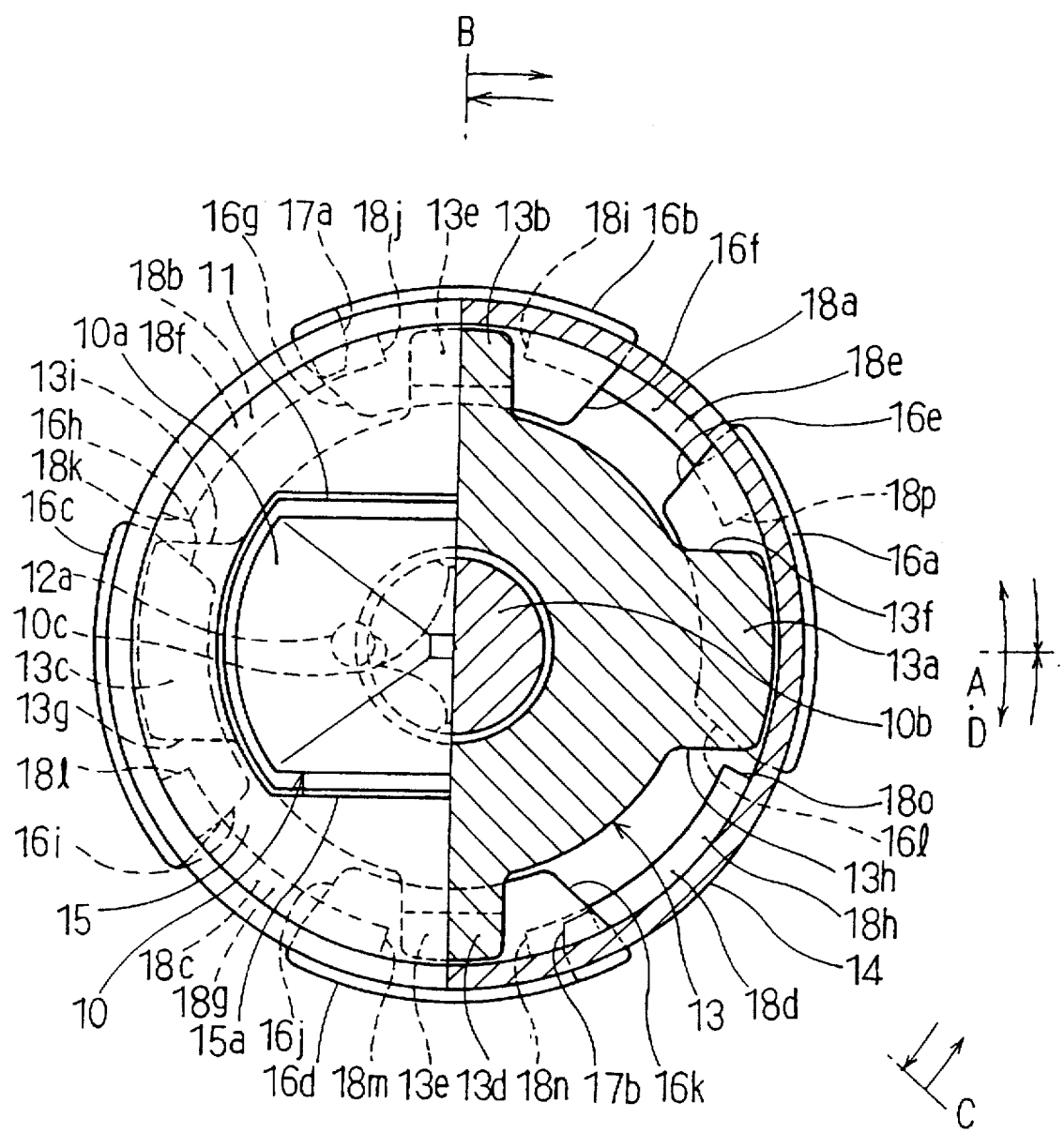
FIG. 4 is a semisectional plan view of the container fixing device which the rotational angle position and the position in upward and downward direction of a cone is at the container receiving state.

(1) When the container 3 is received (FIG. 3, FIG. 4)

The container fixing device 1 in the case of receiving the container 3 lowered from the upper side is in the state shown in FIGS. 3 and 4.

That is, in the container fixing device 1, the projections 13a, 13b, 13c, 13d of the rotary table 13 are all supported at the upper surface of the rotary supports 16a, 16b, 16c, 16d, and the cone 10 and the collar 11 are projected to upper side of the container support plate 15 and located to the top end portion. Also the major axis direction or the minor axis direction of the cone head part 10a is coincident with the major axis direction or the minor axis direction of the collar 11, and the cone 10 can be inserted in the fixing hole 3a of the container 3 lowered from the upper side. Also the steel ball 12a of the pushing member 12 is in the state of being partially enclosed in the recess 10c of the cone stem part 10b. In addition, when the container fixing device 1 is in the state shown in FIGS. 3 and 4, the rotational angle position and the position in upward and downward direction of the cone are said to be in the container receiving position A.

(2) When the container 3 is fixed (FIG. 3, FIG. 4, FIG. 5, FIG. 6)

Figure 5:
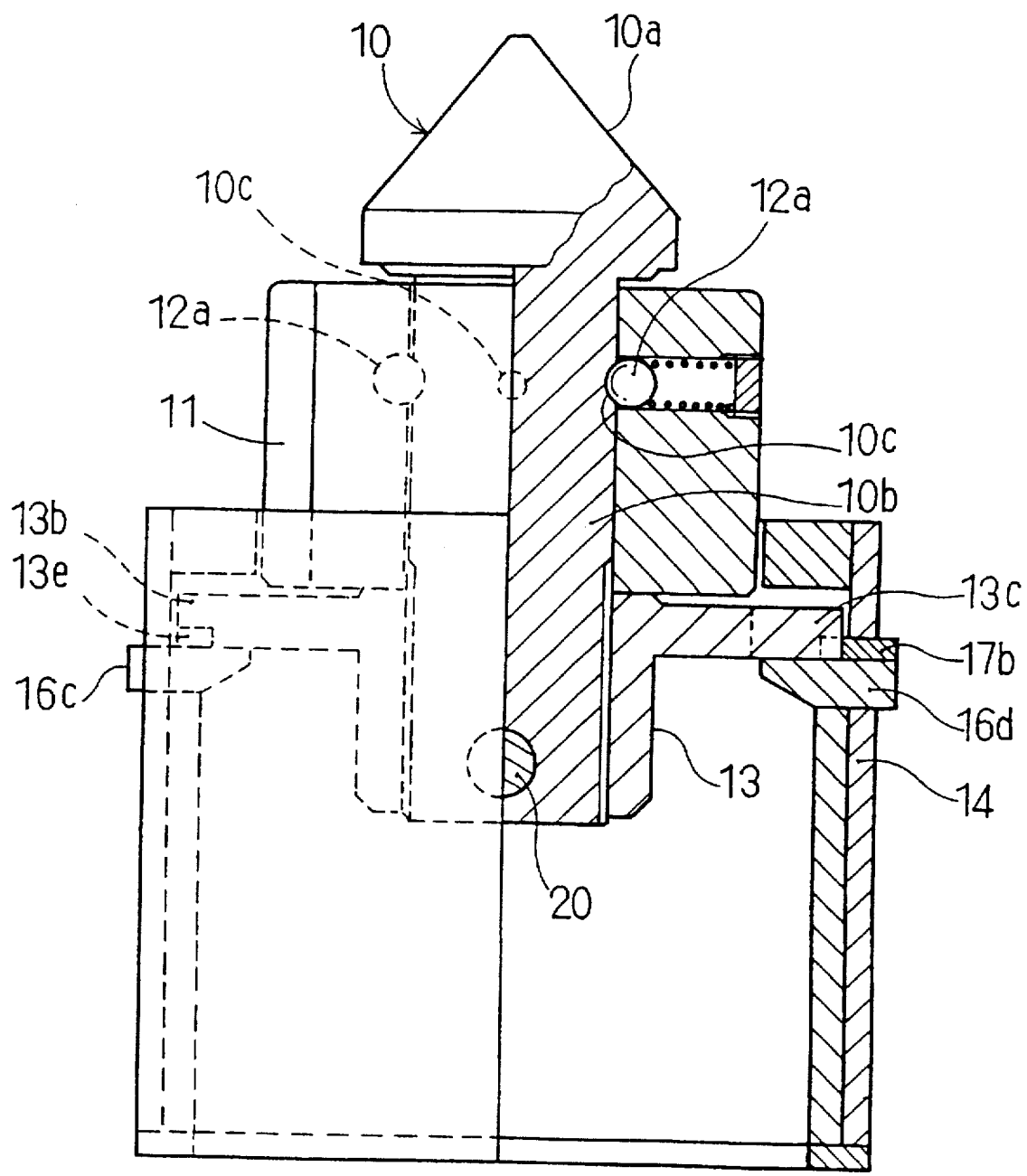
FIG. 5 is a semisectional side view of the container fixing device which the rotational angle position and the position in upward and downward direction of a cone is at the container fixing position.
Figure 6:
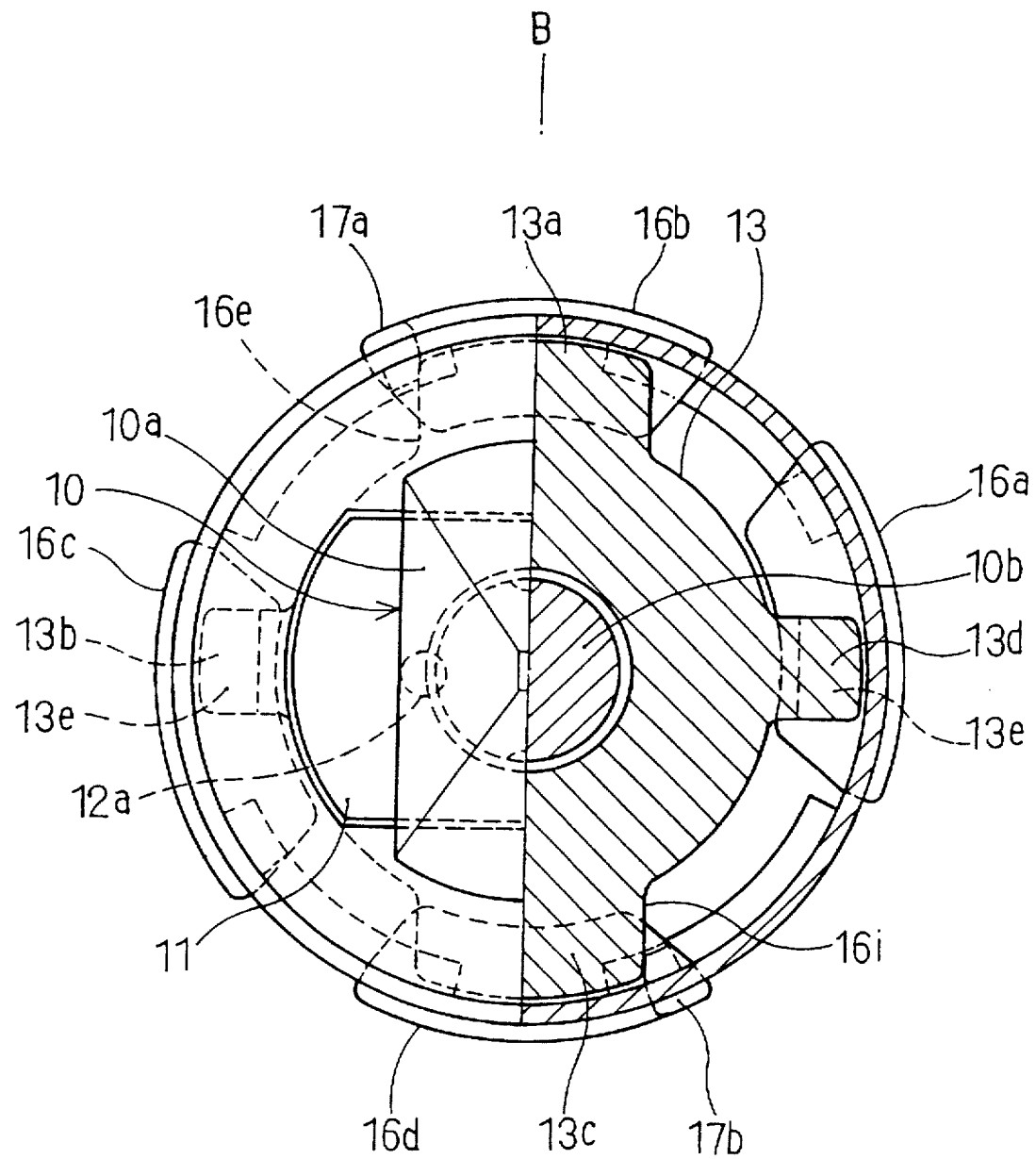
FIG. 6 is a semisectional plan view of the container fixing device which the rotational angle position and the position in upward and downward direction of a cone is at the container fixing position.

When the container fixing device 1 is in the state shown in FIGS. 3 and 4 and the container 3 is lowered from the upper side and the cone 10 is inserted in the fixing hole 3a and the container 3 is set to the bed 2, hand is entered from lower side of the hollow cylindrical housing 14 and the handle 20 is operated for rotation by 90° counterclockwise. By this handle operation, the narrower projections 13b, 13d of the rotary table 13 approach the stopper members 17a, 17b respectively, but do not abut on the stopper members 17a, 17b due to the notch 13e. Consequently the rotation of the rotary table 13 is not obstructed by the stopper members 17a, 17b. Also since the wider projections 13a, 13c of the rotary table 13 are moved from the upper surface of the rotary support 16a to the upper surface of the rotary support 16b and from the upper surface of the rotary support 16c to the upper surface of the rotary support 16d respectively and shorter distance is formed between side surfaces of the rotary supports 16a, 16b and between side surfaces of the rotary supports 16c, 16d, the rotary table 13 is not lowered. Consequently as shown in FIGS. 5 and 6, the cone 10 and the collar 11 hold at the top end position. Also by this handle operation, the cone 10 is rotated by 90° counterclockwise and the major axis direction of the cone head part 10a becomes coincident with minor axis direction of the collar 11, and the cone head part 10a covers partially the peripheral portion of the fixing hole 3a of the container 3 thus the container 3 is fixed to the bed 2. Also the steel ball 12a enclosed in the recess 10c of the cone stem part 10b before the handle operation becomes enclosed in the adjacent recess 10c turned by 90° counterclockwise. Since the steel ball 12a pushes the cone stem part 10b by the compression coil spring 12b, the container fixing state as above described can be held. Also when the handle 20 is operated for rotation by 90° counter-clockwise, since the side surfaces 16e, 16i of the wider projections 13a, 13c of the rotary table 13 abut on the stopper members 17a, 17b, the rotary table 13 is not rotated counter-clockwise beyond 90°. In addition, when the container fixing device 1 is in the state shown in FIGS. 5 and 6, the rotational angle position and the position in upward and downward direction of the cone 10 are said to be in the container fixing position B.

(3) When the container 3 is removed (FIG. 3, FIG. 4, FIG. 5, FIG. 6)

In order to remove the container 3 fixed to the bed 2, the handle 20 of the container fixing device 1 in the state shown in FIGS. 5 and 6 is operated for rotation by 90° clockwise in turn. By this handle operation, the rotational angle position and the position in upward and downward direction of the cone 10 is transferred from the container fixing position B shown in FIGS. 5 and 6 to the container receiving position A shown in FIGS. 3 and 4. Consequently when the container 3 is raised upward, the cone 10 is come out of the fixing hole 3a and the container 3 can be removed from the bed 2.

(4) When the cone 10 and the collar 11 are enclosed in the hollow cylindrical housing 14 (FIG. 3, FIG. 4, FIG. 7, FIG. 8, FIG. 9, FIG. 10)

Figure 7:
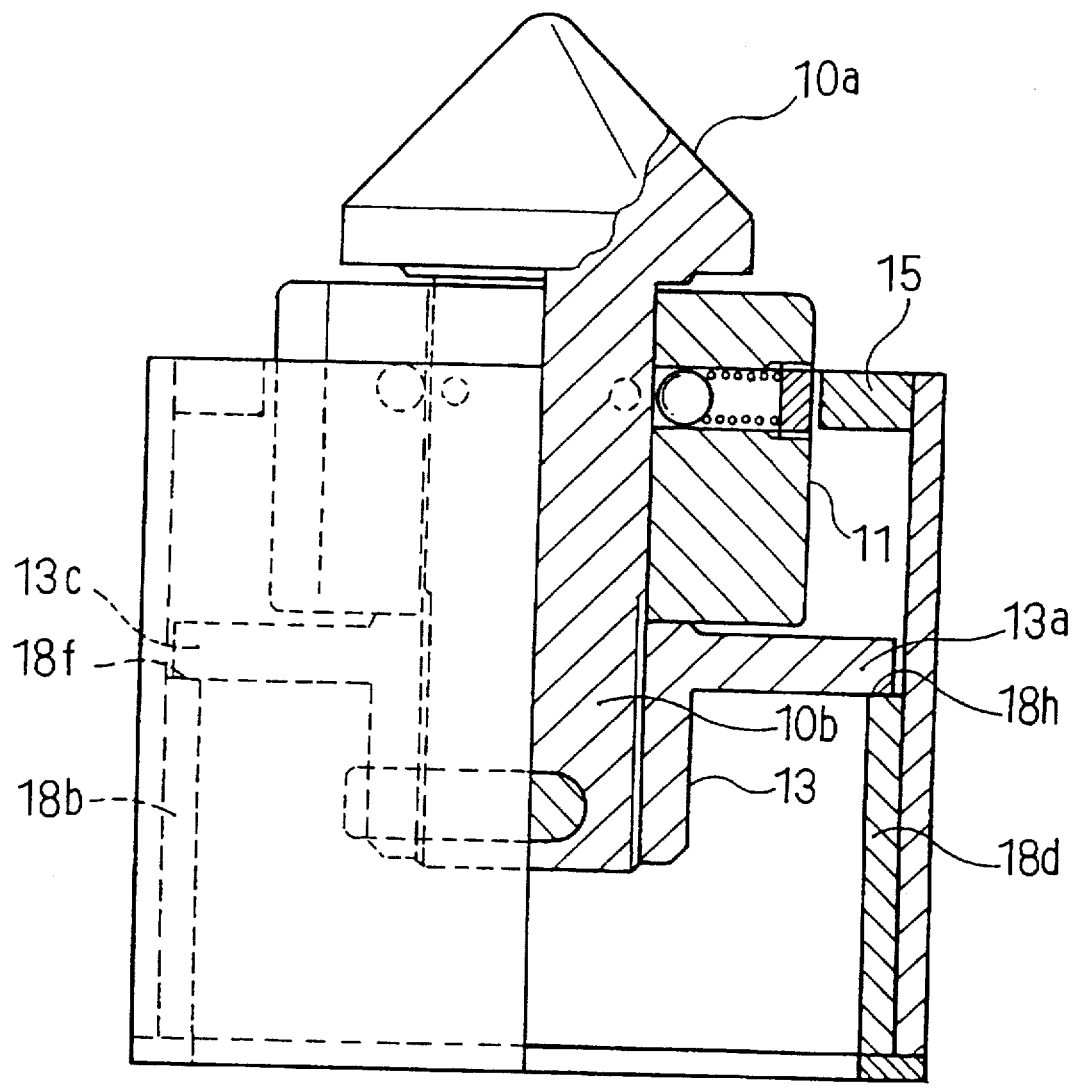
FIG. 7 is a semisectional side view of the container fixing device which the rotational angle position and the position in upward and downward direction of a cone is at the cone lowering position.
Figure 8:
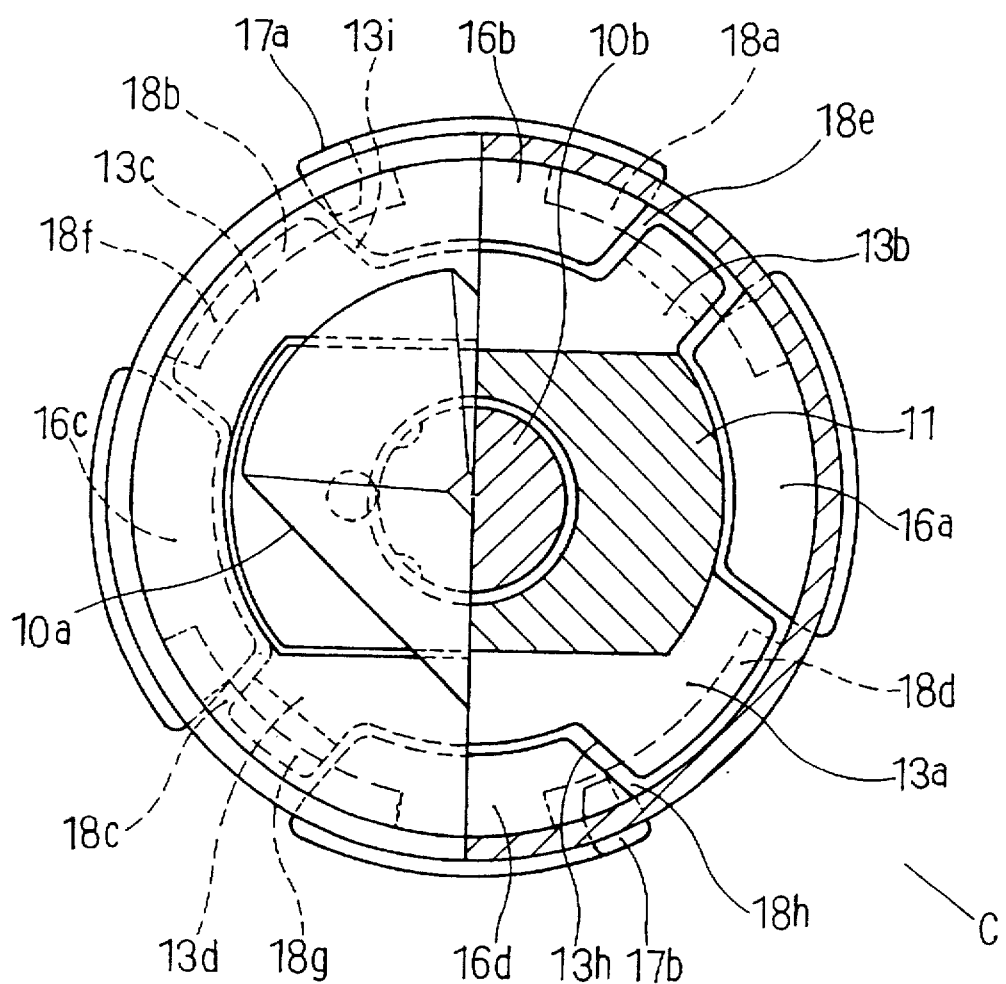
FIG. 8 is a semisectional plan view of the container fixing device which the rotational angle position and the position in upward and downward direction of a cone is at the cone lowering position.

First, the handle 20 of the container fixing device 1 in the state shown in FIGS. 3 and 4 is operated for rotation by about 40° clockwise. By this handle operation, as shown in FIGS. 7 and 8, after the side surfaces 13h, 13i of the rotary table 13 abut on the stopper members 17b, 17a respectively, the wider projections 13a, 13c enter gaps formed by the adjacent rotary supports 16a and 16d, 16b and 16c with longer distance between the side surfaces each other and the narrower projections 13b, 13d enter gaps formed by the adjacent rotary supports 16a and 16b, 16c and 16d with shorter distance between the side surfaces each other. Therefore the rotary table 13 is lowered and the projections 13a, 13b, 13c, 13d are supported by the guide plate upper surfaces 18h, 18e, 18f, 18g and the cone 10 and the collar 11 are lowered by prescribed distance from the top end position. Also by the handle operation as above described, although the major axis direction of the cone head part 10a is not coincident with the major axis direction of the collar 11 and the cone head part 10a covers partially the container support plate 15, in the state that the projections 13a, 13b, 13c, 13d of the rotary table 13 are supported by the guide plate upper surfaces 18h, 18e, 18f, 18g, since the lower surface of the cone head part 10a is positioned higher than the upper surface of the container support plate 15, the lower surface of the cone head part 10a does not interfere with the container support plate 15. In addition, when the container fixing device 1 is in the state shown in FIGS. 7 and 8, the rotational angle position and the position in upward and downward direction of the cone 10 are said to be in the cone lowering position C.

Figure 9:
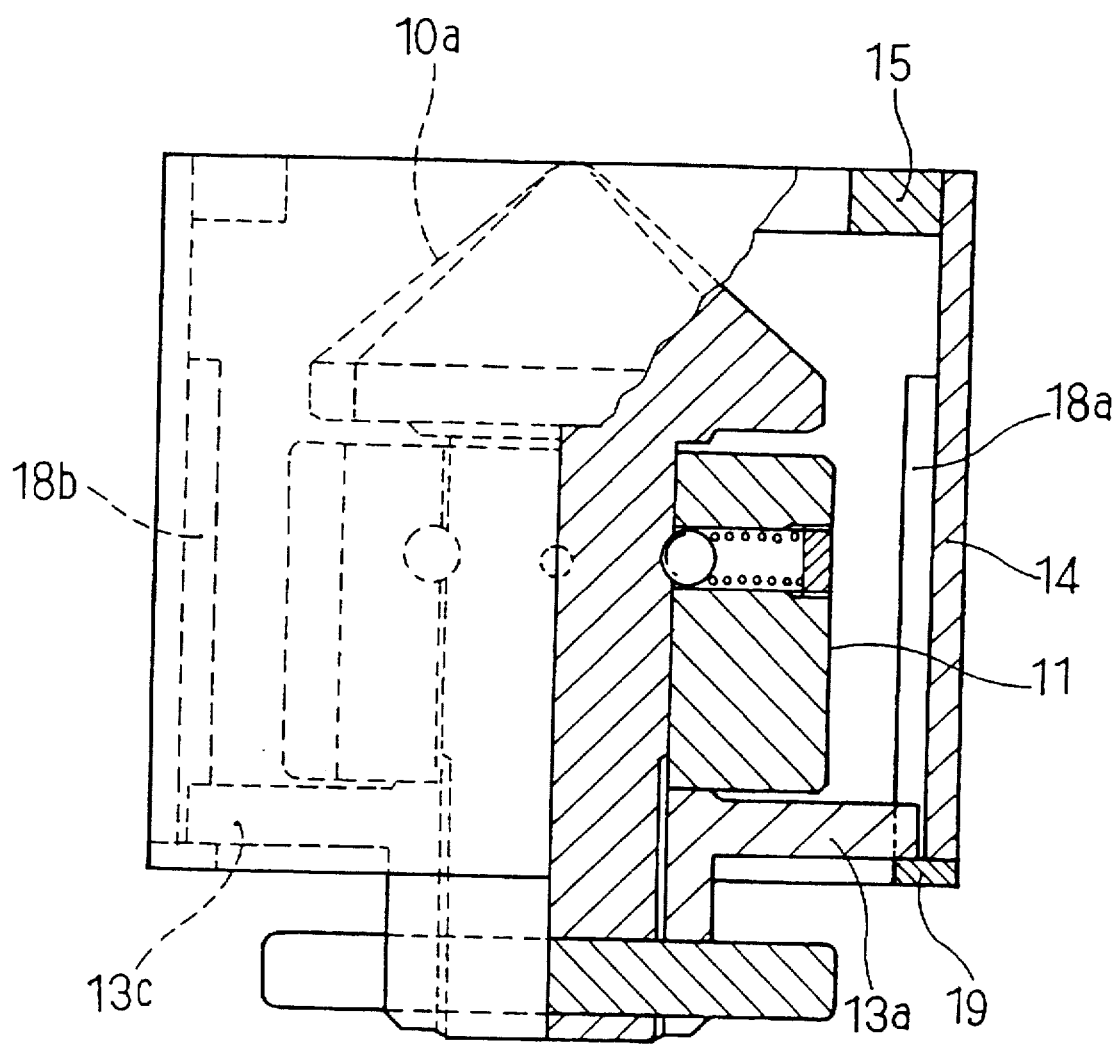
FIG. 9 is a semisectional side view of the container fixing device which the rotational angle position and the position in upward and downward direction of a cone is at the cone enclosing position.
Figure 10:
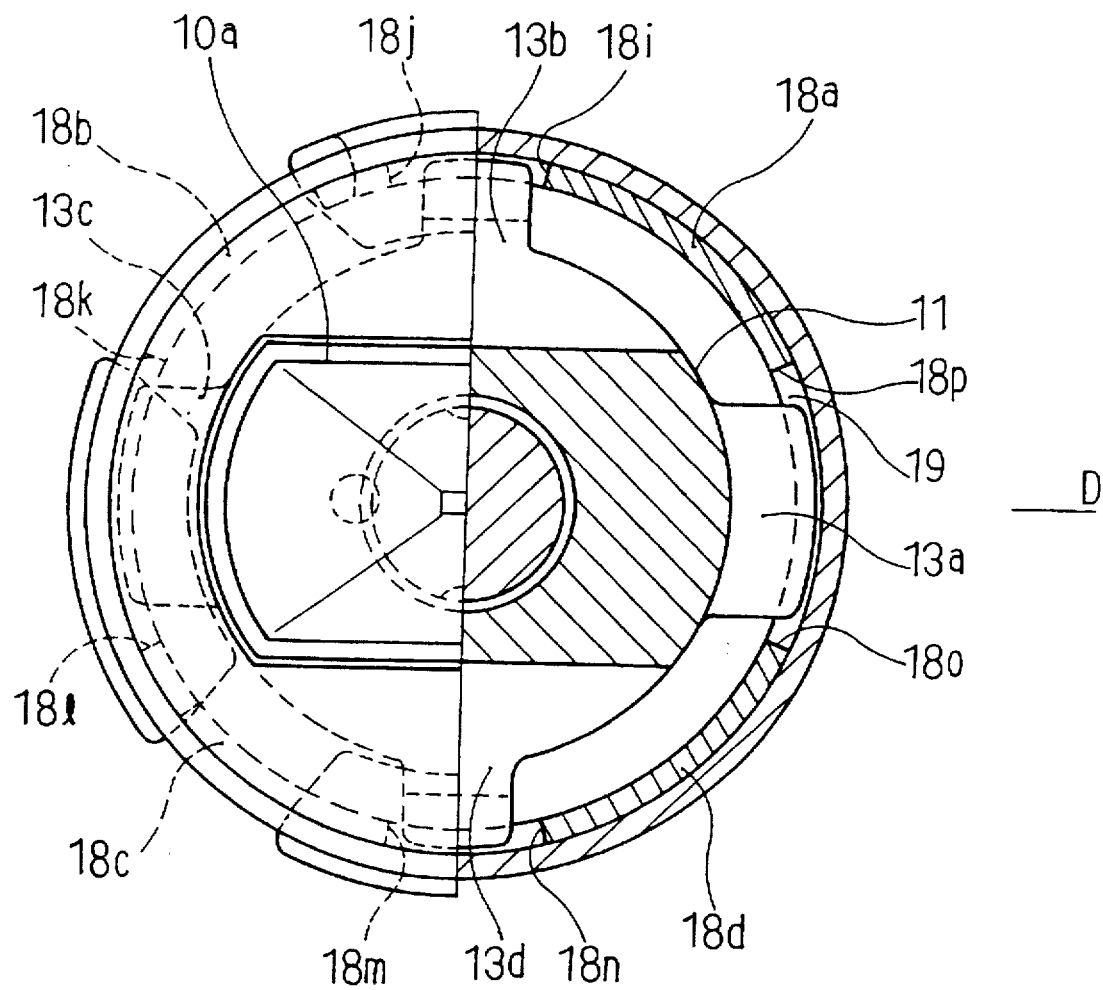
FIG. 10 is a semisectional plan view of the container fixing device which the rotational angle position and the position in upward and downward direction of a cone is at the cone enclosing position.

Next, the handle 20 is operated for rotation by about 40° counterclockwise. By this handle operation, the major axis direction of the cone head part 10a is coincident with the major axis direction of the collar 11 as shown in FIGS. 9 and 10. The wider projections 13a, 13c of the rotary table 13 enter gaps formed by the adjacent guide plates 18d and 18a, 18b and 18c with larger distance between the side surfaces each other, and the narrower projections 13b, 13d enter gaps formed by the adjacent guide plates 18a and 18b, 18c and 18d with shorter distance between the side surfaces each other. Therefore the rotary table 13 is lowered and the projections 13a, 13b, 13c, 13d are supported by the upper surface of the bottom plate 19, and the cone 10 and the collar 11 are lowered to the bottom end position and the top part of the cone 10 and the upper surface of the container support plate 15 have substantially coincident height.

Thus the cone 10 and the collar 11 are enclosed in the inner space of the hollow cylindrical housing 14. In addition, when the container fixing device 1 is in the state shown in FIGS. 9 and 10, the rotational angle position and the position in upward and downward direction of the cone 10 are said to be in the cone enclosing position D.

As above described, according to the container fixing device 1 of this embodiment, since dimension in height of the hollow cylindrical housing 14 can be set to value substantially equal to the sum total of dimensions in height of the cone 10 and the collar 11, the dimension in height of the container fixing device 1 can be reduced and the installation positions can be extended. Also as above described, by simple operation, the rotational angle position and the position in upward and downward direction of the cone 10 can be transferred between the container receiving position A and the container fixing position B, between the container receiving position A and the cone lowering position C, and between the cone lowering position C and the cone enclosing position D.

Also since the stopper members 17a, 17b are provided, the rotational angle position and the position in upward and downward direction of the cone 10 can be limited within the prescribed range. Consequently the worker can know the rotational limit position of the handle 20 easily there by the working process can be advanced while confirming it.

Figure 11:
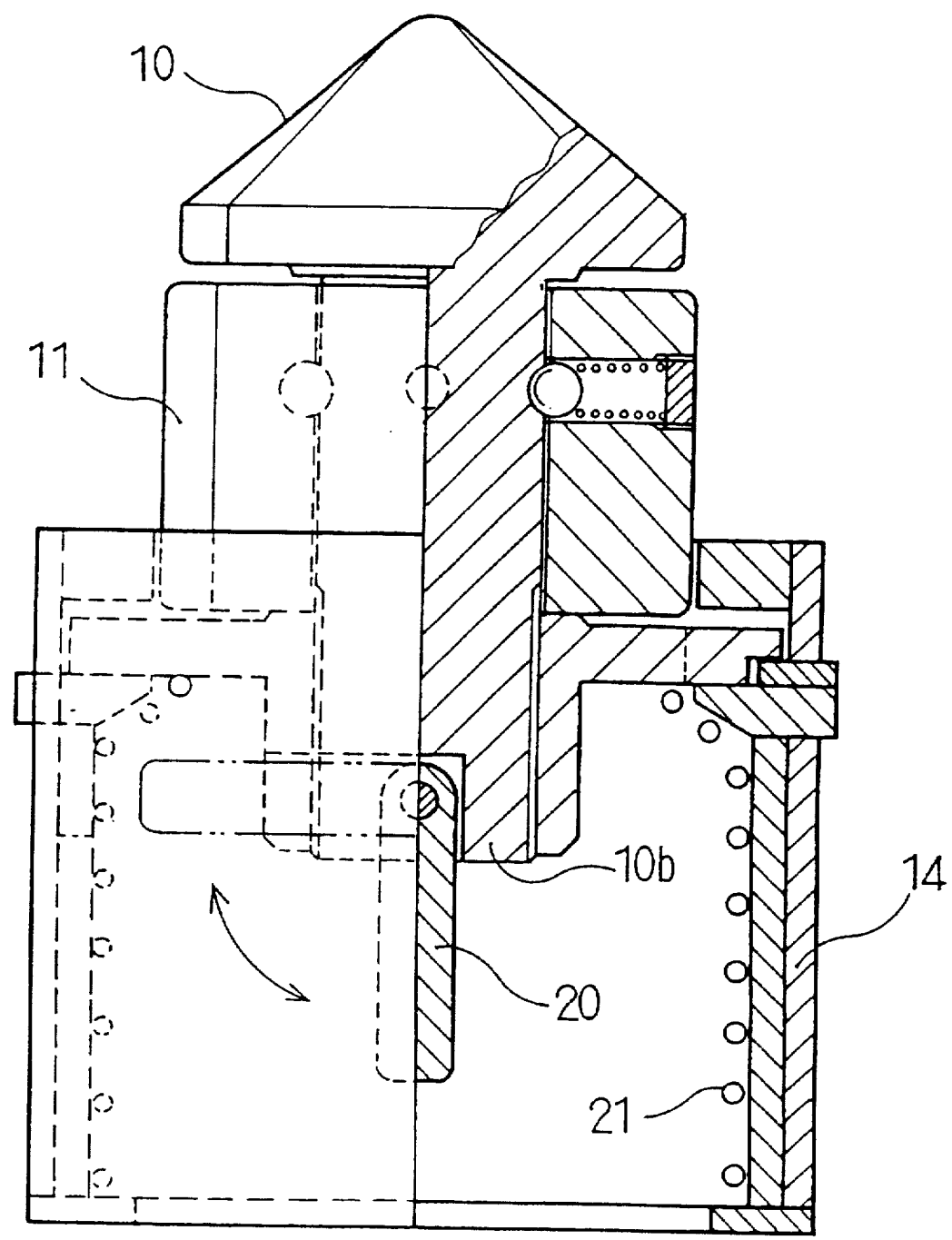
FIG. 11 is a semisectional side view showing a modification of the embodiment.

A container fixing device shown in FIG. 11 is a first modification of the above-mentioned embodiment. In this container fixing device, a handle 20 rotatable by 90° in the vertical plane is mounted on a cone stem part 10b, and a coil spring 21 is interposed within a hollow cylindrical housing 14 thereby reduction of labor is intended when a cone 10 and a collar 11 are transferred from the enclosing state to the projecting state.

Figure 12:
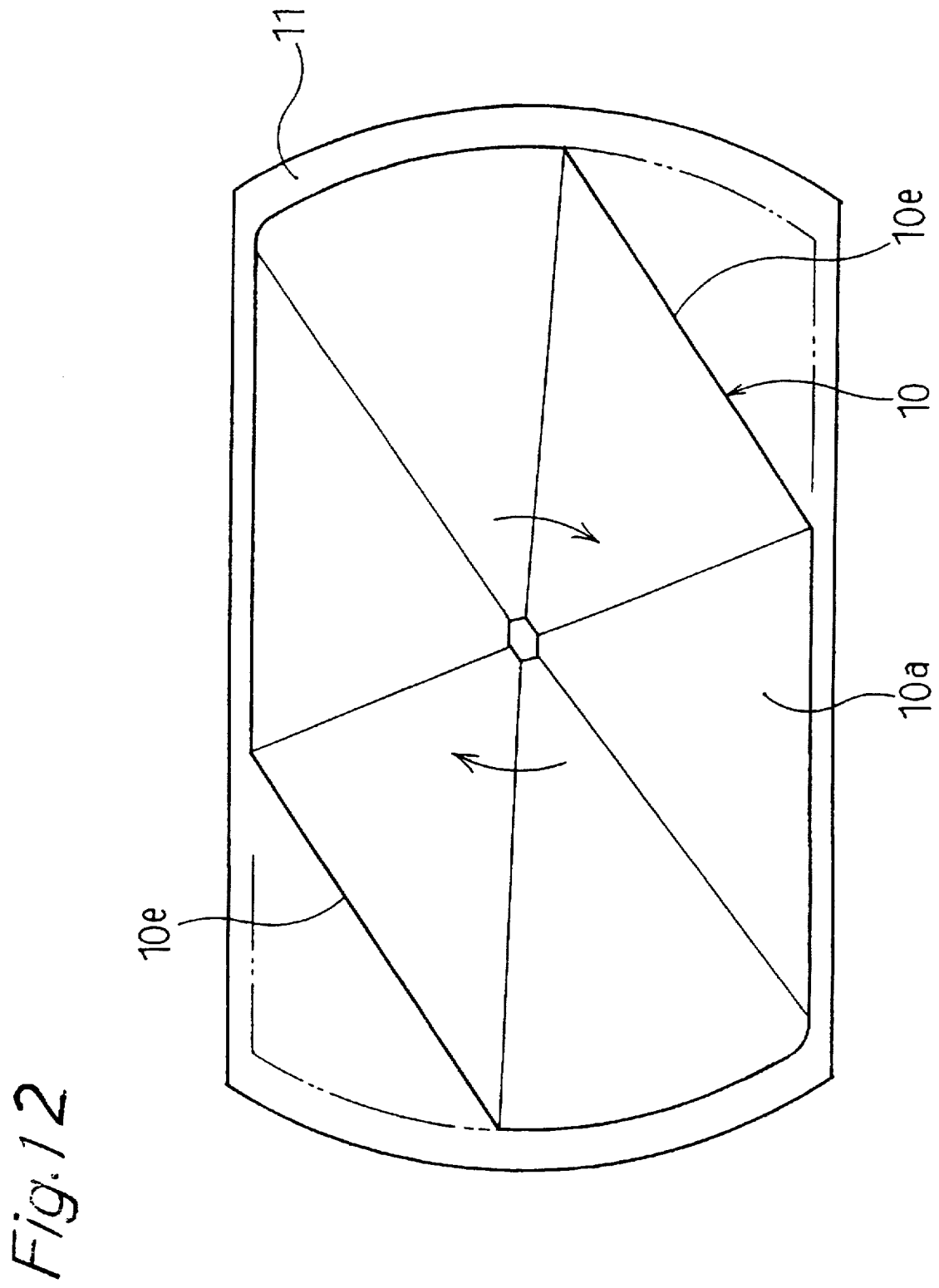
FIG. 12 is a plan view of a cone and a collar of a container fixing device according to another embodiment.
Figure 13:
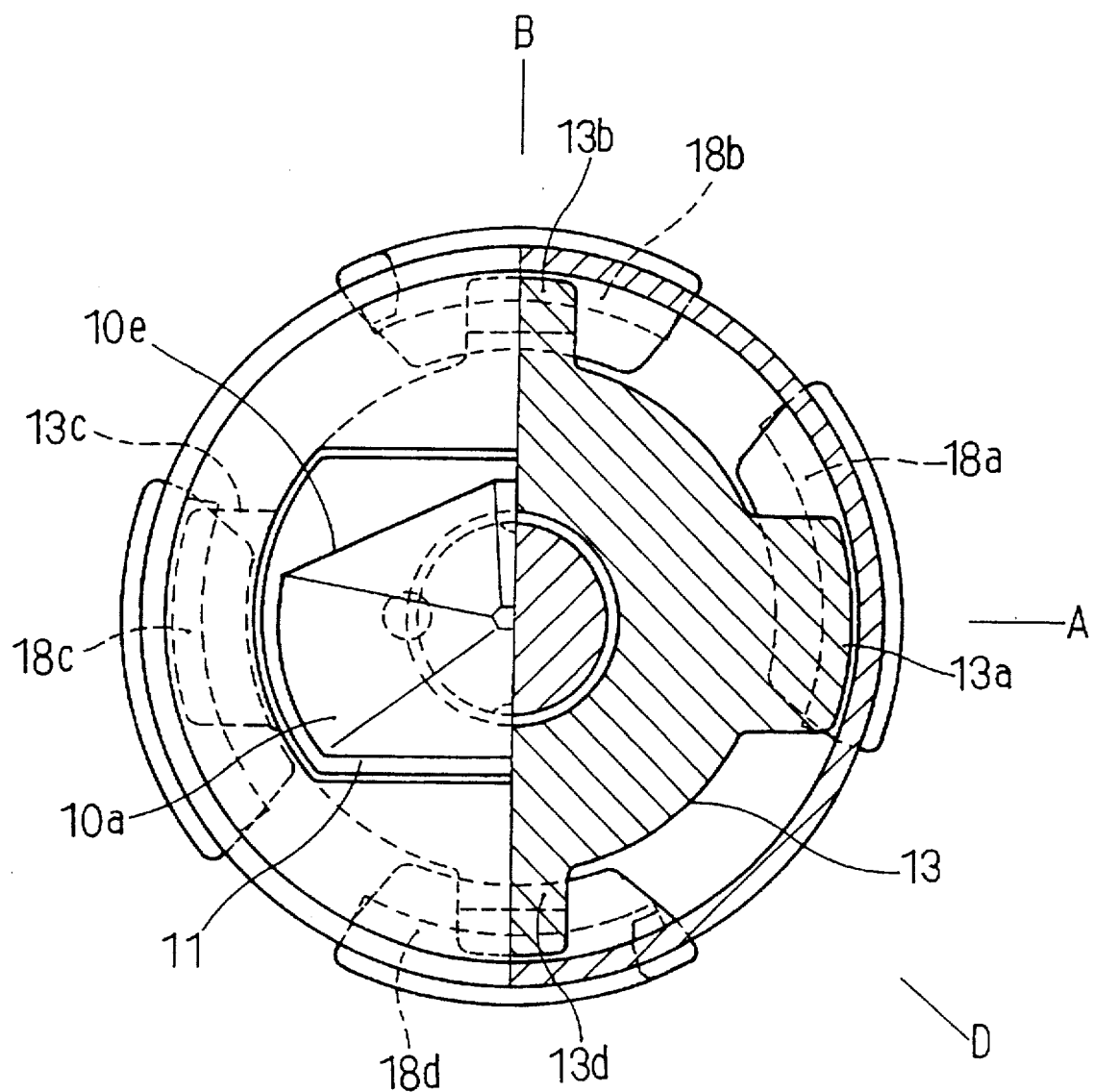
FIG. 13 is a semisectional plan view of the container fixing device.

In a container fixing device 1 shown in FIGS. 12 and 13, when a cone 10 and a collar 11 are enclosed in an inner space of a hollow cylindrical housing 14, even if the rotational angle position and the position in upward and downward direction of the cone 10 are transferred from the container receiving position A to the cone lowering position C (the cone enclosing position D in this embodiment), in order that a cone head part 10a does not cover a container support plate 15 as shown by two dotted line in FIG. 12, the cone head part 10a is provided with a notch 11e and the planar shape as shown in FIG. 12 is formed. Consequently according to the container fixing device 1, guide plates 18a, 18b, 18c, 18d are arranged as shown in FIG. 13 thereby projections 13a, 13b, 13c, 13d of a rotary table 13 can be guided to an upper surface of a bottom plate 19. Therefore the work of transferring the cone 10 and the collar 11 from the enclosing state to the projecting state and the work reverse to this become easy.

Figure 14:
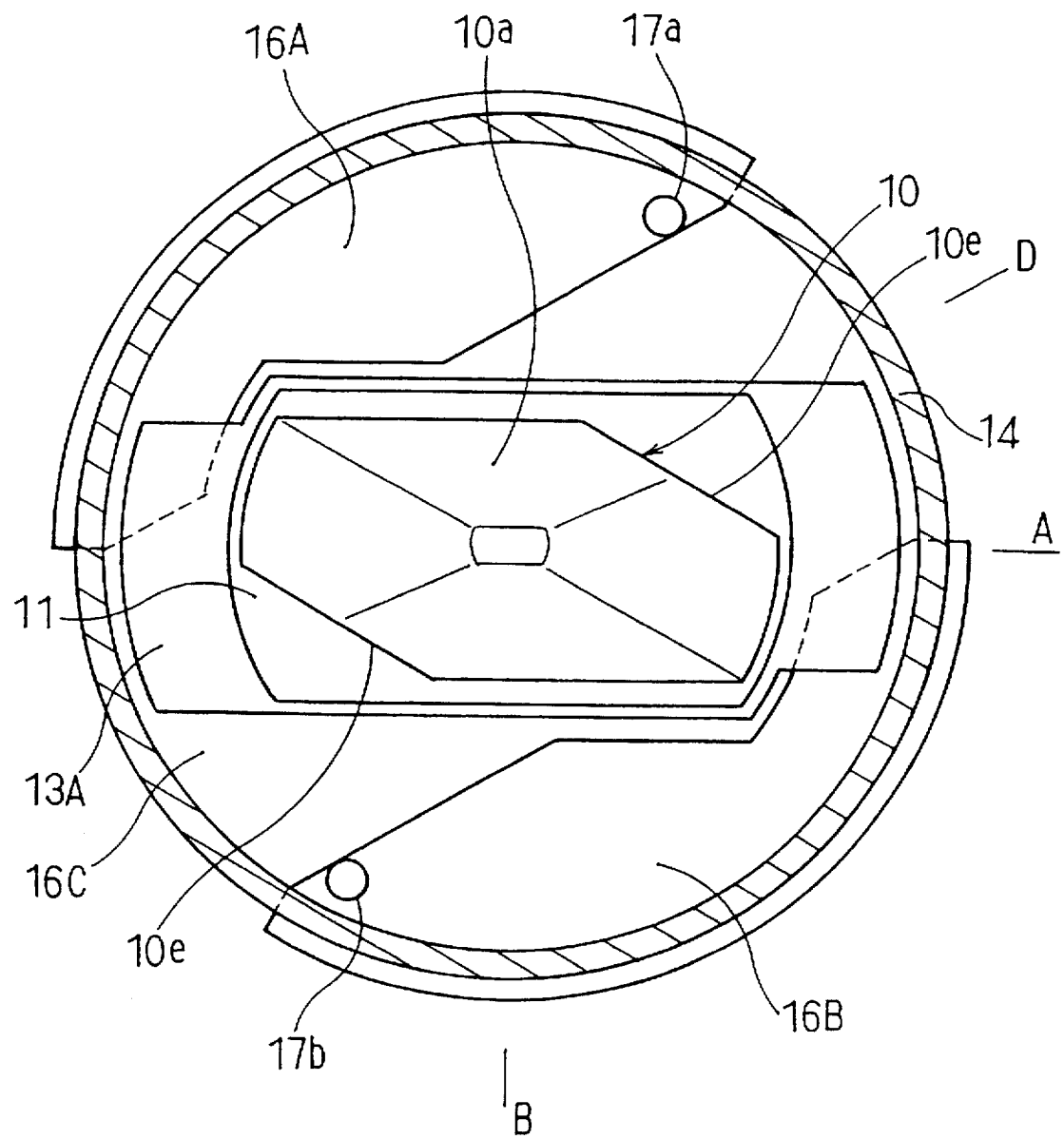
FIG. 14 is a sectional plan view of a container fixing device according to still another embodiment which the rotational angle position and the position in upward and downward direction of a cone is at the container receiving position.
Figure 15:
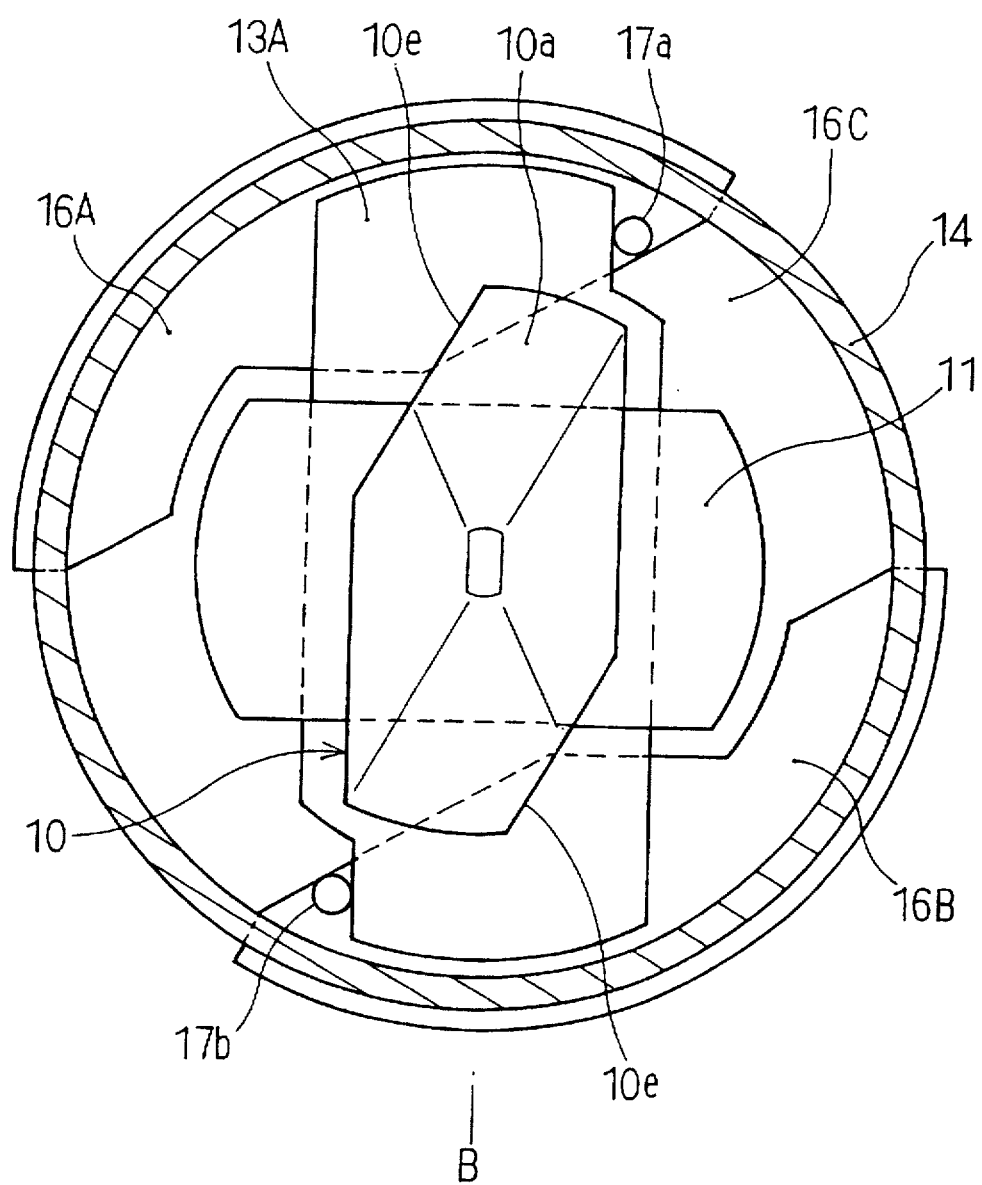
FIG. 15 is a sectional plan view of the container fixing device which the rotational angle position and the position in upward and downward direction of a cone is at the container fixing position in the container fixing device.
Figure 16:
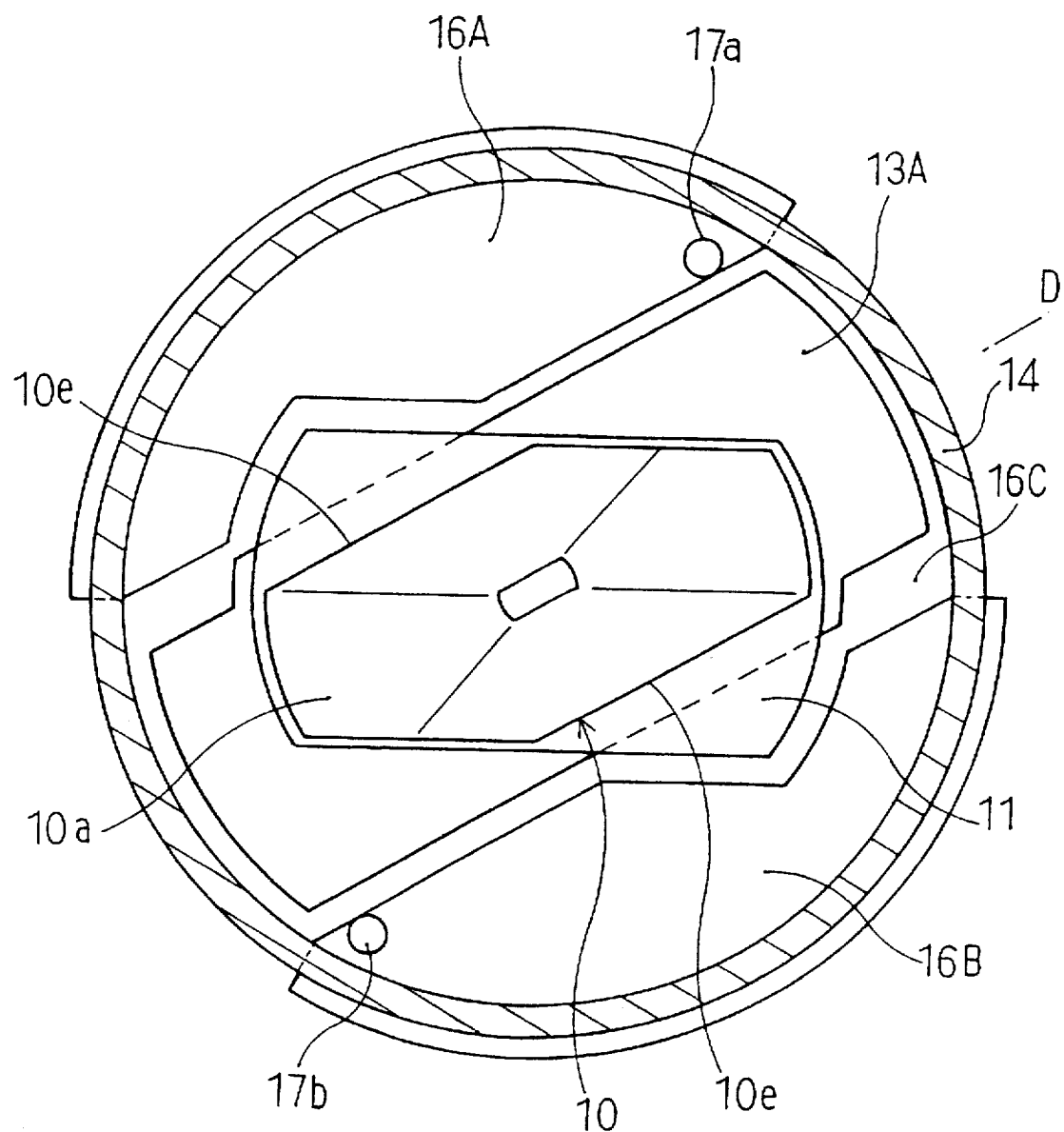
FIG. 16 is a sectional plan view of the container fixing device which the rotational angle position and the position in upward and downward direction of a cone is at the cone enclosing position in the container fixing device.

In a container fixing device 1 shown in FIGS. 14, 15 and 16, a cone head part 10a is provided with a notch 10e in similar manner to the above-mentioned embodiment shown in FIGS. 12 and 13. In the container fixing device 1 of this embodiment, as shown in FIGS. 14-16, a plurality of rotary supports comprise a pair of rotary supports 16A, 16B opposed to each other with respect to a cone stem part. A rotary table 13A has such a planar shape that when the rotational angle position and the position in upward and downward direction of the cone 10 are in the container receiving position A and the container fixing position B, a peripheral portion of the rotary table 13A is supported by the pair of rotary supports 16A, 16B as shown in FIGS. 14 and 15, and that when the rotational angle position and the position in upward and downward direction of the cone 10 are at the cone enclosing position D, the rotary table 13A can enter a gap 16C formed by the pair of rotary supports 16A, 16B as shown in FIG. 16. In addition, other configuration is similar to that in the embodiment in FIGS. 12 and 13.

According to this embodiment, when the rotational angle position and the position in upward and downward direction of the cone 10 are transferred between the container receiving position A and the container fixing position B, since the peripheral portion of the rotary table 13A always abuts on the upper surface of the pair of rotary supports 16A, 16B, the rotary table 13A can be rotated smoothly and generation of noise or the like can be prevented.

A container fixing device 1 shown in FIGS. 17-21 is provided with a cone 10 comprising a head part 10a with length different in planar orthogonal directions and a stem part 10b having diameter less than length in the minor axis direction of the head part 10a. In the cone stem part 10b is formed a lubricating oil passage 10f through which lubricating oil such as grease is supplied. At the bottom end portion of the cone stem part 10b, a vertical hole 10g leading to the lubricating oil passage 10f is formed, and a coil spring 30 and a steel ball 31 are enclosed in the vertical hole 10g. Also at the bottom end portion of the cone stem part 10b, a recess 10h opened to lower side is formed, and a head part 20a of a handle 20 is enclosed in the recess 10h. A through hole 20b is formed on the handle head part 20a in the horizontal direction, and a bolt (horizontal axis) 32a fixed by a nut 32b is inserted in the through hole 20b. The handle 20 can be rotated about the bolt 32a being the rotational axis between the suspension state (use state, state shown by solid line in FIGS. 17 and 18) and the horizontal state (storage state, state shown by two dotted line in FIG. 18). The handle head part 20a is in substantially semicircular plate shape, and on the circular arc surface thereof, two recesses 20c, 20d capable of partially enclosing the steel ball 31 are formed with angle difference of 90°. When the steel ball 31 is enclosed in one recess 20c, that is, as shown by solid line in FIGS. 17 and 18, when the steel ball 31 is subjected to the pushing force by a coil spring 30 and enclosed in one recess 20c, the handle 20 is held in the suspension state. On the other hand, when the steel ball 31 is enclosed in the other recess 20d, that is, as shown by two dotted line in FIG. 18, when the steel ball 31 is subjected to the pushing force by the coil spring 30 and enclosed in the other recess 20d, the handle 20 is held in the horizontal state. The handle head part 20a is provided with a projection 20e so that when the handle 20 is rotated from the suspension state in the direction reverse to the horizontal state, the projection 20e abuts on the bottom surface 10i of the recess 10h of the cone stem part 10b and restricts the rotation of the handle 20.

A collar 11 is fitted to the outer circumferential surface on the upper side of the cone stem part 10b with a gap. The collar 11 is in substantially rectangular bar shape having planar shape corresponding to that of the cone head part 10a and is provided at the center part with a through hole 11b in upward and downward direction in which the cone head part 10b is inserted. In the collar 11, two through holes 11a, 11a in the horizontal direction extending from the outer circumferential surface 11c to the through hole 11b are formed on the same horizontal surface with angle difference of 180°. Each through hole 11a is covered by a setscrew (cover member) 12c, and encloses a coil spring 12b and a steel ball 12a. The steel ball 12a receives pushing force from the coil spring 12b, and pushes a recess 10j formed on the outer circumferential surface of the cone stem part 10b. On the upper side of the through hole 11a, another through hole 11d also extending from the outer circumferential surface 11c of the collar 11 to the through hole 11b and capable of leading to the lubricating oil passage 10f is formed. The through hole 11d is covered by a grease nipple 33. The grease nipple 33 and the setscrew 12c are embedded in each of the through holes 11a, 11d so as not project from the outer circumferential surface 11c of the collar 11. On an outer edge portion of the lower surface 11e of the collar 11, two stopper shafts 11f, 11g are projected at symmetrical positions with respect to the cone stem part 10b. Each of the stopper shafts 11f, 11g is enclosed in grooves 34a, 34b of a rotary plate 34 described later.

At lower position of the collar 11 on the outer circumferential surface of the cone stem part 10b, a rotary plate 34 of disk shape having a female screw 34c on the center portion is arranged integrally by thread coupling. On the outer circumferential end surface of the rotary plate 34, four projections 34d, 34e, 34f, 34g at regular intervals in the circumferential direction are projected in the radial direction. On an outer edge portion of the upper surface of the rotary plate 34, two grooves 34a, 34b are formed at symmetrical positions with respect to the cone stem part 10b. Each groove is formed in a range slightly more than 90° with respect to the cone stem part 10b. One stopper shaft 11f is enclosed in one groove 34a, and the other stopper shaft 11g is enclosed in the other groove 34b. On an outer edge portion of the lower surface of the rotary plate 34, a spring support recess 34h of circular ring shape is formed, and the top end portion of the compression coil spring 21 abuts on the recess 34h.

Further the device 1 is provided with a hollow cylindrical housing 14 and a container support plate 15 arranged integrally to the top end portion of the hollow cylindrical housing 14.

Figure 21:
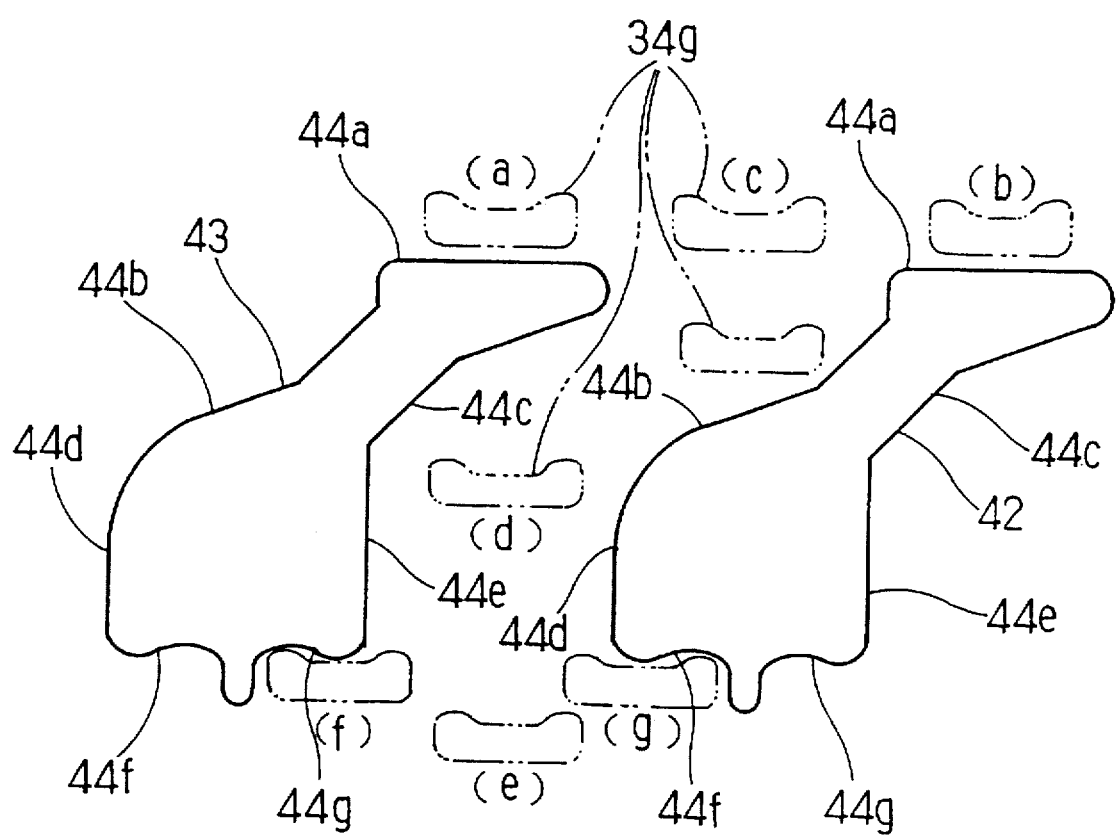
FIG. 21 is a development view of a hollow cylindrical housing with the inner circumferential surface side developed illustrating a guide plate of the container fixing device.

On the bottom end portion of the inner circumferential surface of the hollow cylindrical housing 14, four nuts 35a, 35b, 35c, 35d are arranged with interval of 90°. Bolts 37a, 37b, 37c, 37d are screwed to these nuts 35a, 35b, 35c, 35d in interposing a spring shoe 36 of disk shape provided at the center with a hole 36a allowing the handle 20 to pass in upward and downward direction thereby the spring shoe 36 is attached to the hollow cylindrical housing 14. At the inner circumferential edge portion of the spring shoe 36, a spring support recess 36b of circular ring shape is formed and the bottom end portion of the compression coil spring 21 abuts on the spring support recess 36b. Further on the inner circumferential surface of the hollow cylindrical housing 14, four guide plates 40, 41, 42, 43 are arranged with interval of 90°. Each of the guide plates 40, 41, 42, 43 has the same planar shape as shown in FIG. 21. Each of the guide plates 40, 41, 42, 43 has a horizontal upper surface 44a, two slant surfaces 44b, 44c extending downward respectively from the left end and the right end of the upper surface 44a and guiding the projections 34d, 34e, 34f, 34g of the rotary plate 34 in substantially oblique direction, two vertical surfaces 44d, 44e extending downward from each of the slant surfaces 44b, 44c and guiding the rotary plate projections 34d, 34e, 34f, 34g in vertical direction, and lower surfaces 44f, 44g, that is, locking part extending from each of the vertical surfaces 44d, 44e in the horizontal direction and locking the rotary plate projections 34d, 34e, 34f, 34g by pushing the upper surfaces of the rotary plate projections 34d, 34e, 34f, 34g by the compression coil spring 21.

The container support plate 15 is in square plate shape, and a hole 15a in planar shape slightly larger than that of the collar 11 is formed on the center of the container support plate 15.

Next, the operation method and function of the container fixing device 1 in the above-mentioned constitution will be described.

Figure 17:
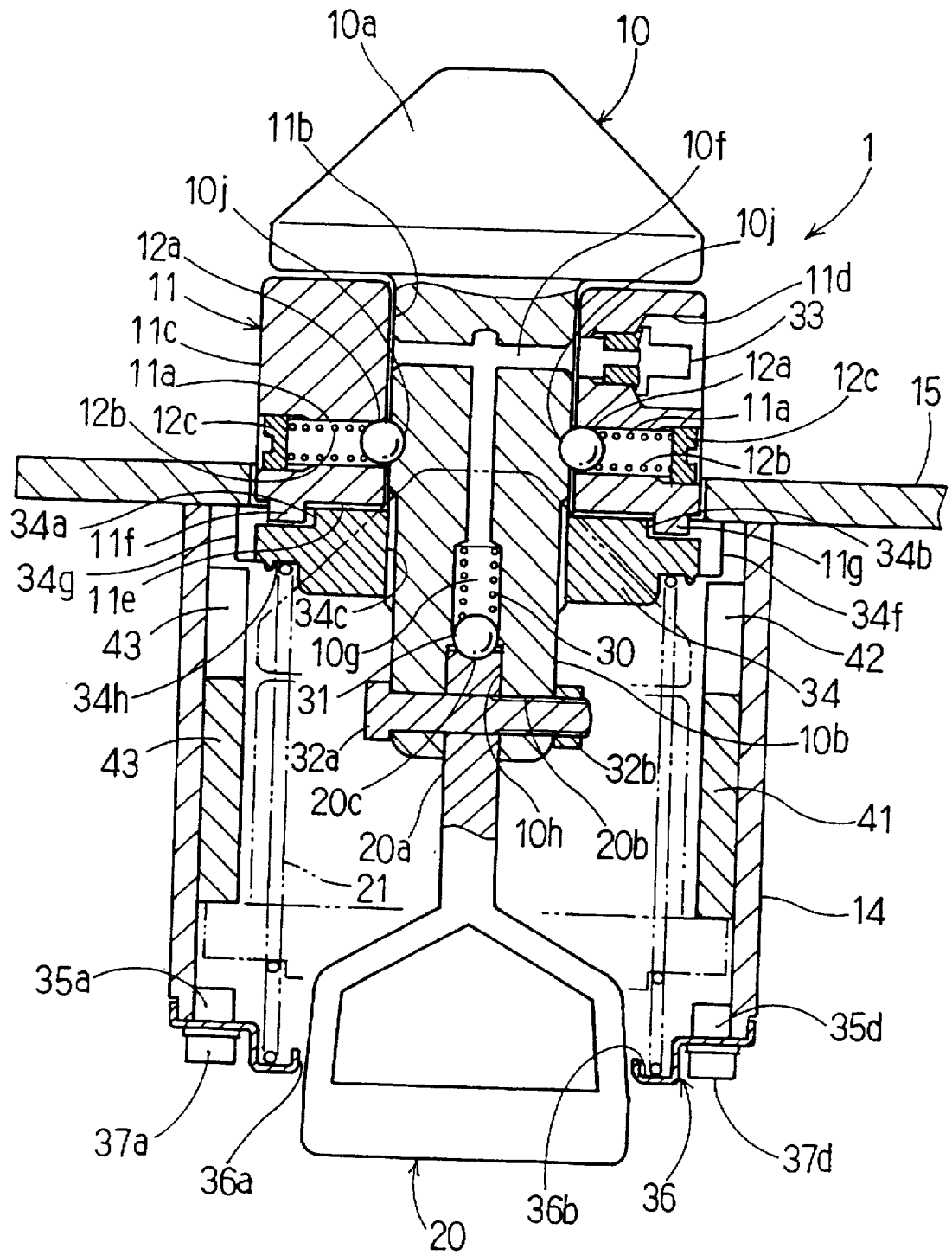
FIG. 17 is a sectional view of a container fixing device according to still another embodiment at the container receiving state (container receiving position) with the section coincident to the major axis direction of the cone.
Figure 18:
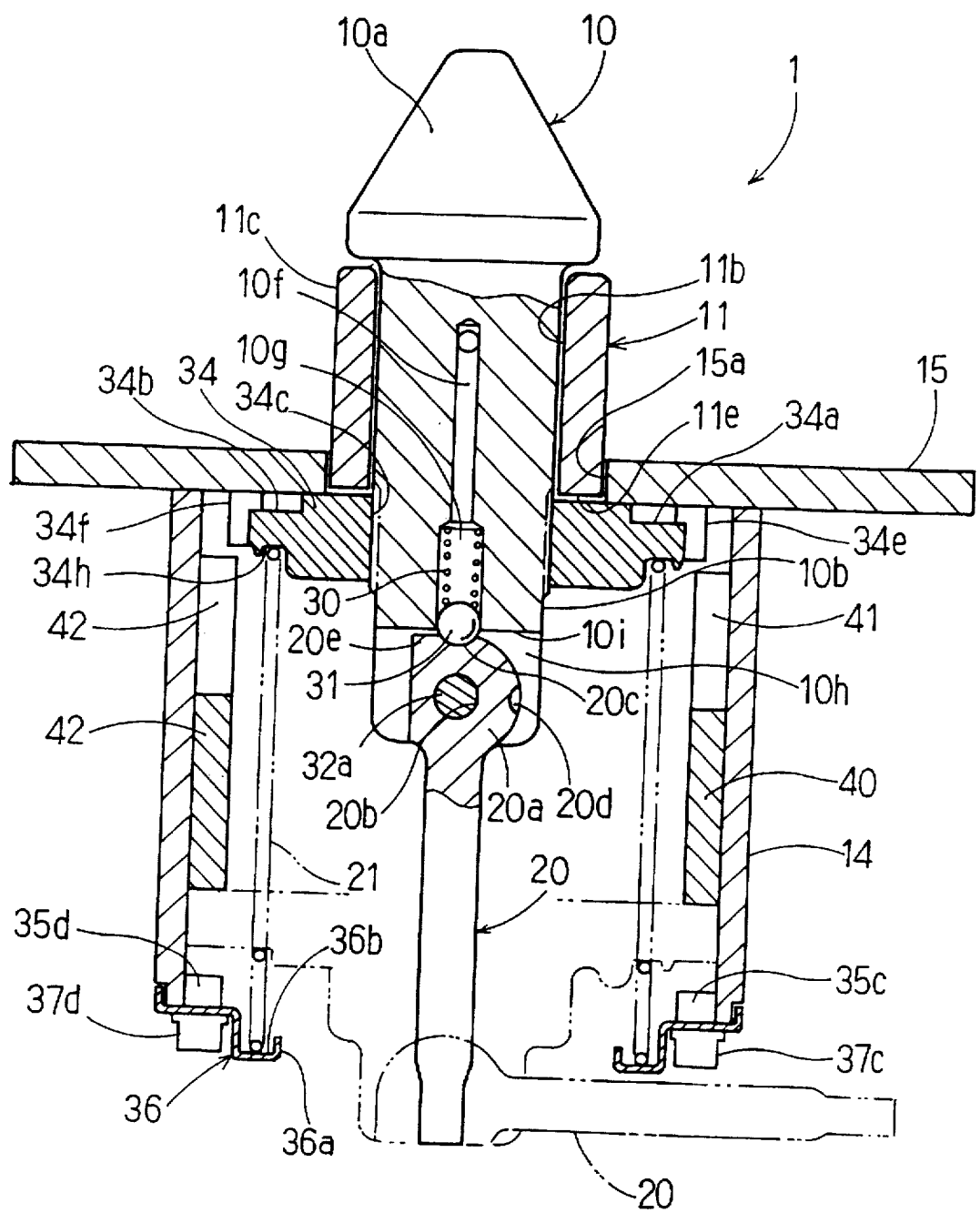
FIG. 18 is a sectional view of the container fixing device at the container receiving state with the section coincident to the minor axis direction of the cone.
Figure 19:
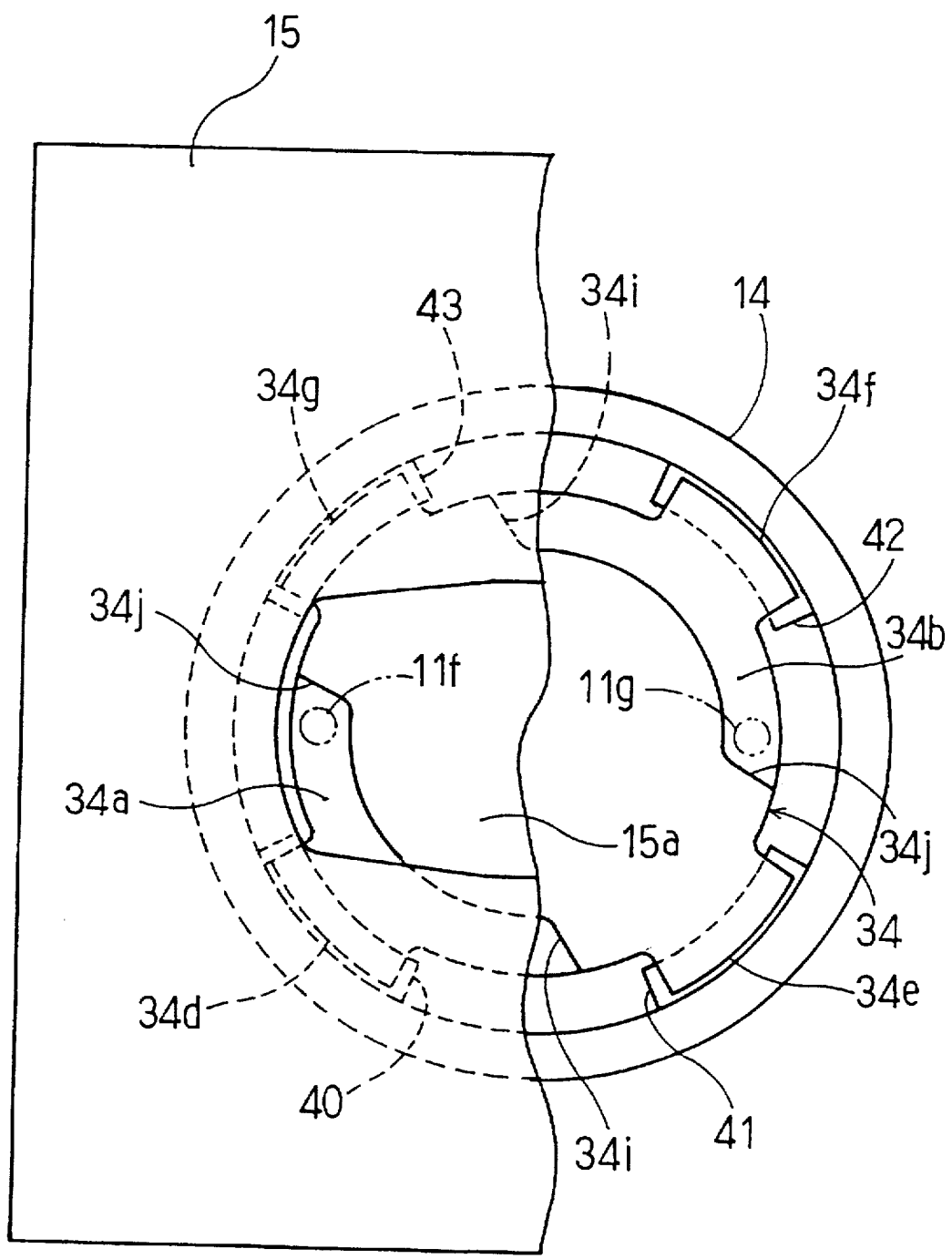
FIG. 19 is a partially cutaway plan view of the container fixing device where a cone and a collar are cut away.
Figure 20:
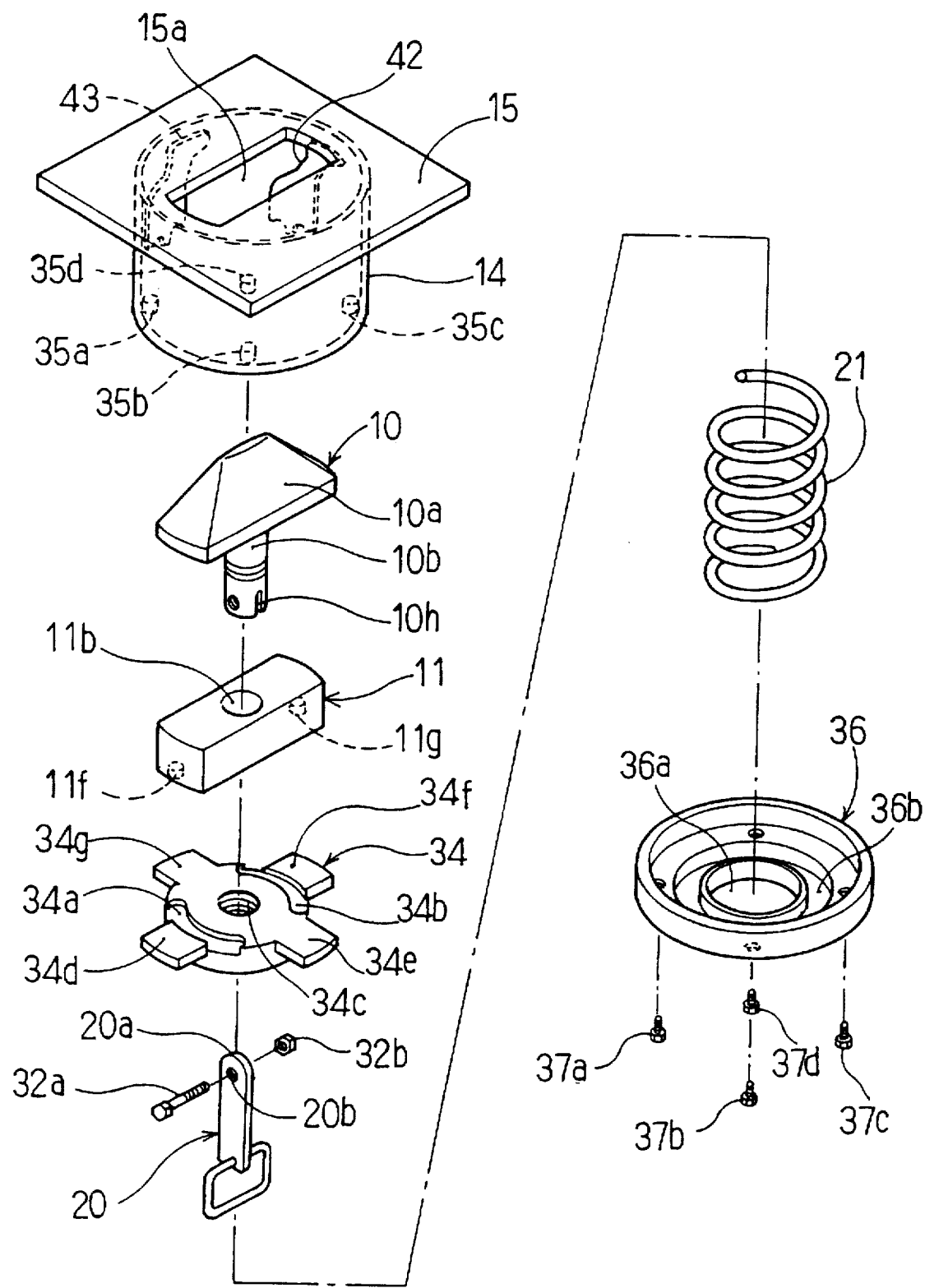
FIG. 20 is a schematic exploded perspective view of the container fixing device.

First, when the device 1 is in the container receiving state as shown in FIGS. 17 and 18, the rotary plate projection, e.g., 34g is positioned on upper side of the upper surface 44a of the corresponding guide plate 43 as shown by (a) in FIG. 21, and the rotary plate 34 is in pushed state to the lower surface of container support plate 15 by the elastic force of the compression coil spring 21. Then the bottom end portion of the collar 11 is positioned in the hole 15a of the container support plate 15 and the major axis direction of the cone 10 and the major axis direction of the collar 11 are coincident.

Under this container receiving state, when the container 3 is Lowered from the upper side and the cone 10 is inserted in the fixing hole 3a and the container 3 is set to the bed 2, hand is entered from the lower side of the hollow cylindrical housing 14 and the handle 20 is operated for rotation clockwise. By this handle operation, the rotary plate 34 is rotated in the state that the stopper shafts 11f, 11g are enclosed in the grooves 34a, 34b, and the cone 10 is rotated clockwise. If the handle 20 is operated for rotation by 90°, one end surface 34i of each of the grooves 34a, 34b abuts on the stopper shafts 11f, 11g and the handle 20 can not be rotated further. When the handle 20 is rotated by 90° in such manner, the device 1 is in the container fixing state where the major axis direction of the cone head part 10a and the minor axis direction of the collar 11 are coincident, and the cone head part 10a covers partially the peripheral portion of the fixing hole 3a of the container 3 thus the container 3 is fixed to the bed 2. During this handle operation, since the rotary plate 34 is subjected to the upward force by the compression coil spring 21, a worker can operate the handle 20 for rotation easily. Also in the container fixing state, the rotary plate projection, e.g., 34g as shown by (b) in FIG. 21 is positioned in the upper side of the upper surface 44a of the guide plate 42, which is adjacent to the guide plate 43 positioned at lower side of the rotary plate projection 34g at the container receiving state.

Next, in order to remove the container 3 fixed to the bed 2, the handle 20 is operated for rotation by 90° counterclockwise. By this handle operation, the rotary plate 34 is rotated in the state that the stopper shafts 11f, 11g are enclosed in the grooves 34a, 34b, and the cone 10 is rotated counterclockwise. If the handle is operated for rotation by 90°, other end surface 34j of each of the grooves 34a, 34b abuts on the stopper shafts 11f, 11g and the handle 20 can not be further rotated. When the handle 20 is rotated by 90° in this manner, the device is returned to the container receiving state where the major axis direction of the cone head part 10a and the major axis direction of the collar 11 are coincident, and the cone head part 10a does not cover the peripheral portion of the fixing hole 3a of the container 3 and the container 3 can be removed from the bed 2.

Next, in order to enclose the cone 10 in the hollow cylindrical housing 14, the handle 20 of the device 1 in the container receiving state is operated for rotation by about 45° clockwise, and the rotary plate projection, e.g., 34g is moved to the position shown by (c) in FIG. 21, that is, the position between the upper surface 44a of one guide plate 43 among the adjacent guide plates and the upper surface 44a of other guide plate 42. If the handle 20 is operated for lowering from this state against the elastic force of the compression coil spring 21, the rotary plate projection, e.g., 34g abuts on the slant surface 44b of the guide plate 42 and is guided in left oblique downward direction and comes to the position shown by (d) in FIG. 21, that is, the position just below the position (a) of the rotary plate 34g in the container receiving state Then by the rotating operation, the cone head part 10a rotated by about 45° clockwise from the position in the container receiving state is rotated by about 45° counterclockwise and returns to the position in the container receiving state. If the handle 20 is further operated for lowering, the cone head part 10a passes through the hole 15a of the container support plate 15 and is enclosed in the hollow cylindrical housing 14. Also if the rotary plate projection, e.g., 34g comes to the position shown by (e) in FIG. 21, that is, the position lower than the lower surfaces 44f, 44g of the guide plates 42, 43, the handle 20 is operated for rotation either clockwise or counterclockwise. When the rotary plate projection, e.g., 34g comes to the position shown by (f) or (g) in FIG. 21, that is, the position substantially below the lower surface 44f or 44g of any one of the guide plate 42 or 43, if the handle 20 is released, the rotary plate projection, e.g., 34g is pushed and locked to the lower surface 44f or 44g of the guide plate 42 or 43 by the elastic force of the compression coil spring 21. And then the handle 20 is operated for rotation about the horizontal shaft 32a being the rotational center and the device is transferred from the suspension state until that time to the horizontal state suitable for enclosing. Here, the handle 20 can obtain two horizontal states different in angle depending on that the rotary projection, e.g., 34g is locked to the lower surface 44f of the guide plate 42 or the lower surface 44g of the guide plate 43 among the two guide plates 42 and 43. Therefore the enclosing state is selected corresponding to the installation position of the device 1 thereby the suitable enclosing state can be obtained.

Finally in order to transfer the device 1 from the cone enclosing state to the container receiving state, the handle 20 in the enclosing state (horizontal state) is transferred to the suspension state and then operated for lowering against the elastic force of the compression coil spring 21, and the rotary plate projection, e.g., 34g is separated from the lower surface 44f or 44g of the guide plate 42 or 43. Next, the handle 20 is operated for rotation, and the rotary plate projection, e.g., 34g is brought to the position (e) between the lower surface 44f of one guide plate 42 among the adjacent guide plates and the lower surface 44g of the other guide plate 43. When the force applied to the handle 20 is released, the rotary plate 34 is subjected to the elastic force of the compression coil spring 21, and the projection, e.g., 34g first rises in just vertical upward direction and then rises in rightward oblique upward direction abutting on the slant surface 44c of the guide plate 43, and comes to the position shown by (c) in FIG. 21. Here, while the rotary plate projection, e.g., 34g rises from the position (e) to the position (d), since the cone head part 10a is in the same angle position as that in the container receiving state, the cone head part 10a passes through the hole 15a of the container support plate 15 and can project to the outside. Also when the rotary plate projection, e.g., 34g came to the position (c), the rotary plate 34 is pushed to the lower surface of the container support plate 15, and the cone head part 10a projects at maximum and has angle difference of about 45° to the collar 11. Next, if the handle 20 is operated for rotation counterclockwise, the rotary plate 34 is rotated in the state that the stopper shafts 11f, 11g are enclosed in each of the grooves 34a, 34b, and the cone 10 is rotated counterclockwise. When the handle 20 is operated for rotation by about 45°, other end surface 34j of the grooves 34a, 34b abut on the stopper shafts 11f, 11g and the handle 20 can not be further operated for rotation. Then the cone head part 10a becomes the container receiving state where the major axis direction of the cone head part 10a is coincident with the major axis direction of the collar 11.

As above described, according to the embodiment shown in FIGS. 17–21, since the cone 10 can be enclosed in the hollow cylindrical housing 14 while it is not used, dimension in height of the device 1 can be reduced, and the installation position can be extended Also since the upward pushing force is applied to the rotary plate 34 by the compression coil spring 21, when the device is transferred from the cone enclosing state to the container receiving state, the force of raising the cone 10 becomes unnecessary and the work becomes easy. When the cone head part 10a is rotated so as to transfer the state between the container receiving state and the container lock state, since the stopper shafts 11f, 11g abut on the end surfaces 34i, 34j of the grooves 34a, 34b thereby the rotational angle position of the cone 10 is restricted, the worker can know the rotation limit position of the handle 20 easily thereby the work can be advanced while confirming the working process. Also in the cone enclosing state, the handle 20 can be brought down from the suspension state that the bottom end position of the handle is projected downward from the bottom end position of the hollow cylindrical housing 14 to the horizontal state that the bottom end position of the handle has substantially the same height position as that of the bottom end position of the hollow cylindrical housing 14. Therefore height dimension of the device 1 in the cone enclosing state can be reduced, and the compact enclosing state can be realized. Also the rotational angle position of the handle 20 in the cone enclosing state is set to two different rotational angle positions depending on to which of the locking parts 44f, 44g of the neighboring guide plates 40, 41, 42, 43 are locked the rotary plate projections 34d, 34e, 34f, 34g. Therefore in response to circumstances where the device 1 is installed, the rotational angle position of the handle 20 suitable for the circumstances can be selected.

What is claimed is:

1. A container fixing device comprising:
   a rotatable cone comprising a head part with length different in planar orthogonal directions and a stem part having diameter less than length in the minor axis direction of said head part;

a collar having planar shape corresponding to that of said cone head part and fitted to upper side of said cone stem part with a gap;

a plurality of pushing members arranged on said collar for pushing an outer circumferential surface of said cone stem part elastically and determining the rotational angle position of said cone;

a rotary table arranged to lower side of said cone stem part integrally for supporting said collar;

a hollow cylindrical housing having an inner space capable of enclosing said cone and said collar;

a container support plate formed projecting to the inside at the top end portion of said hollow cylindrical housing, and forming a hole corresponding to planar shape of said collar;

a plurality of rotary supports arranged projecting to the inside at upper side of said hollow cylindrical housing and at lower side of said container support plate, and capable of supporting a peripheral portion of said rotary table;

a plurality of guide plates having an upper surface capable of supporting the peripheral portion of said rotary table, and arranged at an inner circumferential surface of said hollow cylindrical housing and at lower side of said rotary supports;

a bottom plate arranged projecting to the inside at the bottom end portion of said hollow cylindrical housing, and capable of supporting the peripheral portion of said rotary table; and a handle arranged at the bottom end portion of said cone and operated by the external force to rotate said cone, wherein said rotary table has such planar shape that while the rotational angle position and the position in upward and downward direction of said cone are transferred from the container receiving position to the container fixing position, said rotary table is always supported by said rotary supports and said cone can be maintained to the top end position, and when the rotational angle position and the position in upward and downward direction of said cone are transferred from the container receiving position to the cone lowering position, the supporting of said rotary table by said rotary supports is released and said cone can be lowered, and said guide plate is formed so that when the rotational angle position and the position in upward and downward direction of said cone are in the cone lowering position, the peripheral portion of said rotary table is supported by the upper surface, and when the rotational angle position and the position in upward and downward direction of said cone are transferred from the cone lowering position to the cone enclosing position, the peripheral portion of said rotary table can be guided to the upper surface of said bottom plate by the side surface.

2. A container fixing device as set forth in claim 1, wherein a stopper member capable of abutting on the side surface of the peripheral portion of said rotary table, and limiting the rotational angle position and the position in upward and downward direction of said cone within range from the container fixing position to the cone lowering position is provided on the upper surface of said rotary supports.

3. A container fixing device comprising: a rotatable (10) cone comprising a head part with length different in planar orthogonal directions and a stem part having diameter less than length in the minor axis direction of said head part;

- a collar having planar shape corresponding to that of said cone head part and fitted to upper side of said cone stem part with a gap;
- a plurality of pushing members arranged on said collar for pushing an outer circumferential surface of cone stem part elastically and determining the rotational angle position of said cone;
- a rotary table arranged to lower side of said cone stem part integrally for supporting said collar;
- a hollow cylindrical housing having an inner space capable of enclosing said cone and said collar;
- a container support plate formed projecting to the inside at the top end portion of said hollow cylindrical housing, and forming a hole corresponding to planar shape of said collar;
- a plurality of rotary supports arranged projecting to the inside at upper side of said hollow cylindrical housing and at lower side of said container support plate, and capable of supporting a peripheral portion of said rotary table;
- a plurality of guide plates arranged at an inner circumferential surface of said hollow cylindrical housing and at lower side of said rotary supports;
- a bottom plate arranged projecting to the inside at the bottom end portion of said hollow cylindrical housing, and capable of supporting the peripheral portion of said rotary table; and
- a handle arranged at the bottom end portion of said cone and operated by the external force to rotate said cone, wherein said cone head part is in planar shape having a notch so that when the rotational angle position and the position in upward and downward direction of said cone are transferred from the container receiving position to the cone enclosing position, said cone head part does not cover said container support plate, said rotary table has such planar shape that while the rotational angle position and the position in upward and downward direction of said cone are transferred from the container receiving position to the container fixing position, said rotary table is always supported by said rotary supports and said cone can be maintained to the top end position, and when the rotational angle position and the position in upward and downward direction of said cone are transferred from the container receiving position to the cone enclosing position, the supporting of said rotary table by said rotary supports is released and said cone can be lowered, and said guide plate is formed so that when the rotational angle position and the position in upward and downward direction of said cone are transferred from the container receiving position to the cone enclosing position, the peripheral portion of said rotary table can be guided to the upper surface of said bottom plate by the side surface.

4. A container fixing device as set forth in claim 3, wherein the plurality of rotary supports comprise a pair of rotary supports opposed to each other with respect to said cone stem part, and said rotary table has such planar shape that when the rotational angle position and the position in upward and downward direction of said cone are in the container receiving position and the container fixing position, the peripheral portion is supported by the pair of rotary supports, and when the rotational angle position and the position in upward and downward direction of said cone are in the cone enclosing position, the rotary table can enter a gap formed by the pair of rotary supports.

5. A container fixing device as set forth in claim 3 or claim 4, wherein a stopper member capable of abutting on the side surface of the peripheral portion of said rotary table, and limiting the rotational angle position and the position in upward and downward direction of said cone within range from the container fixing position to the cone enclosing position is provided on the upper surface of said rotary supports.

6. A container fixing device comprising:

- a cone comprising a head part with length different in planar orthogonal directions and a stem part having diameter less than length in the minor axis direction of said head part;
- a collar having planar shape corresponding to that of said cone head part and fitted to upper side of said cone stem part with a gap;
- a rotary plate arranged to said cone stem part integrally at lower side of said collar and having a plurality of projections at an outer edge;
- a hollow cylindrical housing having an inner space capable of enclosing said cone head part and said collar;
- a container support plate arranged at the top end portion of said hollow cylindrical housing and having a hole capable of passing said cone head part and said collar;
- a spring shoe arranged projecting to the inside at the bottom end portion of said hollow cylindrical housing;
- a compression coil spring arranged between the lower surface of said rotary plate and said spring shoe for applying upward pushing force to said rotary plate;
- a handle connected to the bottom end portion of said cone stem part and operated from the outside; and
- a plurality of guide plates arranged in the inner circumferential surface of said hollow cylindrical housing and forming a passage guiding said rotary plate projections in substantially oblique direction, and having a locking part capable of locking said rotary plate projections at the bottom end portion, wherein when said rotary plate is pushed to the lower surface of said container support plate by said compression coil spring and the major axis direction of said cone head part and the major axis direction of said collar are coincident, the device is in the container receiving state, in the container receiving state, when said handle is operated for rotation by about 90° in the prescribed direction and the major axis direction of said cone head part and the minor axis direction of said collar are coincident, the device is in the container lock state, and in the container receiving state, when said handle is operated for rotation by about 45° in the prescribed direction and said handle is operated for lowering against the upward pushing force of said compression coil spring applied to said rotary plate, said rotary plate projections are guided to said passage formed by a said guide plate, and on the midway of the guiding, coincidence of the major axis direction of said cone head part and the major axis direction of said collar is realized, and by this coincidence, said cone head part can pass through the hole of said container support plate, and then after said handle is further operated for lowering, if said handle is operated for rotation in the prescribed direction, said rotary plate projections are locked to the locking part of said guide plate, and the device is in the cone enclosing state where said cone head part is positioned at lower side of said container support plate.

7. A container fixing device as set forth in claim 6, wherein a groove is formed partially on the upper surface of said rotary plate along the circumferential direction, and a stopper shaft to be enclosed in said groove is projected to the lower surface of said collar.

8. A container fixing device as set forth in claim 6 or claim 7, wherein a horizontal shaft is arranged to said cone stem part, and the end portion of said handle is rotatably connected to the horizontal shaft.

9. A container fixing device as set forth in claim 8, wherein said rotary plate projections can be locked to any locking part of adjacent guide plates.

* * * * *